US008855888B2

(12) United States Patent
Suzuki

(10) Patent No.: US 8,855,888 B2
(45) Date of Patent: Oct. 7, 2014

(54) ENGINE MISFIRE IDENTIFICATION DEVICE FOR INTERNAL COMBUSTION ENGINE, VEHICLE EQUIPPED WITH THE SAME AND METHOD OF ENGINE MISFIRE IDENTIFICATION

(75) Inventor: Takashi Suzuki, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1790 days.

(21) Appl. No.: 12/084,882

(22) PCT Filed: Oct. 26, 2006

(86) PCT No.: PCT/JP2006/321331
§ 371 (c)(1),
(2), (4) Date: May 12, 2008

(87) PCT Pub. No.: WO2007/072627
PCT Pub. Date: Jun. 28, 2007

(65) Prior Publication Data
US 2010/0152991 A1    Jun. 17, 2010

(30) Foreign Application Priority Data

Dec. 21, 2005  (JP) ................ 2005-367750

(51) Int. Cl.
*G06F 19/00*   (2011.01)
*F02D 29/00*   (2006.01)
*G01M 15/11*   (2006.01)

(52) U.S. Cl.
CPC ............ *F02D 29/00* (2013.01); *G01M 15/11* (2013.01)
USPC ......................................... 701/99

(58) Field of Classification Search
CPC ................ G01M 15/11; F02D 29/00
USPC ............ 701/99, 101, 102, 107, 111; 123/406.16, 406.24–406.27, 406.36; 73/114.02–114.11; 903/905
See application file for complete search history.

(56) References Cited

U.S. PATENT DOCUMENTS 5,544,058 A * 8/1996 Demizu et al. ................ 701/29
5,633,456 A   5/1997 Stander
(Continued)

FOREIGN PATENT DOCUMENTS

EP     1 348 856 A1   10/2003
JP     A-05-180064    7/1993
(Continued)

OTHER PUBLICATIONS

European Search Report issued in European Patent Application No. EP 06 82 2307 on Nov. 25, 2009.

*Primary Examiner* — Helal A Algahaim
*Assistant Examiner* — Nga X Nguyen
(74) *Attorney, Agent, or Firm* — Oliff PLC

(57) ABSTRACT

An engine misfire is identified by ordinary engine misfire detection processing when the operating condition of an engine comprising a rotation speed Ne and a torque Te does not belong to a resonance region of a rear portion including a damper as a torsion element (S120), and an engine misfire is identified by resonance-region engine misfire detection processing, which is different from the ordinary engine misfire detection processing, when the operating condition of an engine belongs to a resonance region of a rear portion including a damper (S130). This enables an engine misfire to be identified more reliably and with good accuracy regardless of whether the operating condition of an engine belongs to a resonance region of a rear portion including a damper.

33 Claims, 13 Drawing Sheets

(56) References Cited

U.S. PATENT DOCUMENTS

| | | | |
|---|---|---|---|
| 5,831,263 A * | 11/1998 | Komachiya et al. | 250/227.17 |
| 6,522,024 B1 * | 2/2003 | Takaoka et al. | 290/40 C |
| 6,799,453 B2 * | 10/2004 | Miyauchi et al. | 73/114.04 |
| 7,712,356 B2 * | 5/2010 | Suzuki | 73/114.04 |
| 2003/0163242 A1 * | 8/2003 | Miyauchi et al. | 701/111 |
| 2004/0122585 A1 * | 6/2004 | Aono et al. | 701/111 |
| 2005/0193804 A1 | 9/2005 | Kokubo | |
| 2009/0151469 A1 * | 6/2009 | Suzuki | 73/847 |

FOREIGN PATENT DOCUMENTS

| | | |
|---|---|---|
| JP | A-10-231750 | 9/1998 |
| JP | A-2001-65402 | 3/2001 |
| JP | A-2001-317402 | 11/2001 |
| JP | A-2001-323839 | 11/2001 |
| JP | A-2003-286890 | 10/2003 |
| JP | A-2005-248909 | 9/2005 |
| JP | A-2005-343458 | 12/2005 |

* cited by examiner

ENGINE MISFIRE IDENTIFICATION DEVICE FOR INTERNAL COMBUSTION ENGINE, VEHICLE EQUIPPED WITH THE SAME AND METHOD OF ENGINE MISFIRE IDENTIFICATION

TECHNICAL FIELD

The present invention relates to an engine misfire identification device for an internal combustion engine, a vehicle equipped with this engine misfire identification device, and an engine misfire identification method. More particularly, the invention relates to an engine misfire identification device that identifies an engine misfire in a multiple-cylinder internal combustion engine in which an output shaft is connected to a rear portion via a torsion element, a vehicle equipped with an internal combustion engine and this engine misfire identification device, and an engine misfire identification method for identifying an engine misfire in a multiple-cylinder internal combustion engine in which an output shaft is connected to a rear portion via a torsion element.

BACKGROUND ART

As such engine misfire identification device of this kind for an internal combustion engine, there has been proposed engine misfire identification device in a vehicle in which a motor capable of generating electrical power is attached to a crankshaft of an engine, and an engine misfire of the engine is identified on the basis of a torque correction amount of the motor during the damping control that involves canceling out a torque variation of the engine by the motor (refer to Patent Document 1, for example). In this apparatus, in a case where damping control by the motor is not performed and in a case where the engine is operating at a high rotation speed and a high torque even when damping control by the motor is performed, an engine misfire is identified on the basis of a variation in the rotation in a crank angular position. In case where damping control by the motor is performed and the engine is operating at a low rotation speed or at a low torque, a misfire of the engine is identified on the basis of a torque correction amount of the motor during damping control.
[Patent Document 1] Japanese Patent Laid-Open No. 2001-65402

DISCLOSURE OF THE INVENTION

When damping control is being performed as in the above-described apparatus, it is difficult to identify an engine misfire in conventional engine misfire identification methods. However, factors responsible for the difficulty with which an engine misfire is identified are not limited to this damping control. For example, when an engine is connected to a transmission and the like via a torsion element, such as a damper, which is used to suppress a torque variation of an engine, at some drive points of the engine, the whole transmission including the damper resonates, making it difficult to identify an engine misfire.

An engine misfire identification device for an internal combustion engine, a vehicle equipped with this engine misfire identification device, and an engine misfire identification method in accordance with the present invention have as their object more reliably identifying an engine misfire in an internal combustion engine connected to a rear portion via a torsion element, such as a damper. Also, an engine misfire identification device for an internal combustion engine, a vehicle equipped with this engine misfire identification device, and an engine misfire identification method in the present invention have as their another object identifying, with good accuracy, an engine misfire in an internal combustion engine connected to a rear portion via a torsion element, such as a damper.

To achieve at least some of the above-described objects, the following techniques are adopted in an engine misfire identification device for an internal combustion engine, a vehicle equipped with this engine misfire identification device, and an engine misfire identification method in accordance with the present invention.

The present invention is directed to a first engine misfire identification device for an internal combustion engine that identifies an engine misfire for a multiple-cylinder internal combustion engine in which an output shaft is connected to a rear portion via a torsion element. The engine misfire identification device includes:

a rotation position detection unit that detects a rotation position of an output shaft of the internal combustion engine, a unit rotation-angle rotation speed computation unit that computes a unit rotation-angle rotation speed, which is a rotation speed for each prescribed unit rotation angle of the output shaft of the internal combustion engine, based on the detected rotation position, and an engine misfire identification unit that makes an identification as to whether or not any one of cylinders of the internal combustion engine undergoes an engine misfire by using a first technique for the computed unit rotation-angle rotation speed, when the drive point of the internal combustion engine does not belong to a resonance region of a rear portion including the torsion element, and makes an identification as to whether or not any one of cylinders of the internal combustion engine undergoes an engine misfire by using a second technique, which is different from the first technique, for the computed unit rotation-angle rotation speed, when the drive point of the internal combustion engine belongs to the resonance region.

In the first engine misfire identification device for an internal combustion engine of the present invention, when the drive point of a multiple-cylinder internal combustion engine does not belong to a resonance region of a rear portion including a torsion element that connects the internal combustion engine to the rear portion, an identification is made as to whether or not any one of cylinders of the internal combustion engine undergoes an engine misfire by using a first technique for a unit rotation-angle rotation speed, which is a rotation speed for each prescribed unit rotation angle of an output shaft of an internal combustion engine and is computed on the basis of the rotation position of the output shaft of the internal combustion engine. When the drive point of the internal combustion engine belongs to a resonance region, an identification is made as to whether or not any one of cylinders of the internal combustion engine undergoes an engine misfire by using a second technique different from the first technique for a unit rotation-angle rotation speed. In this manner, by changing identification techniques depending on whether or not the drive point of an internal combustion engine belongs to a resonance region of a rear portion including a torsion element that connects the internal combustion engine to the rear portion, it is possible to identify an engine misfire more reliably and with good accuracy when the drive point of an internal combustion engine belongs to a resonance region.

In the first engine misfire identification device for an internal combustion engine of the present invention, the first technique may be a technique for identifying an engine misfire on the basis of a variation in the computed unit rotation-angle rotation speed, and in that the second technique may be a technique for identifying an engine misfire on the basis of a variation in a rotation speed after filtering that is obtained by applying a high-pass filter that cuts a low-frequency region for the computed unit rotation-angle rotation speed.

In the first engine misfire identification device for an internal combustion engine of the present invention in an aspect based on the use of a high-pass filter as this second technique, the above-described second technique may also be a technique that involves using a high-pass filter suitable for the rotation speed of the above-described internal combustion engine. In this case, the above-described second technique may also be a technique that uses a high-pass filter which is such that the larger the rotation speed of the internal combustion engine, a region of not more than a high frequency will be cut in proportion. Furthermore, in this case, the above-described second technique may also be a technique that involves using a high-pass filter that cuts a region of not more than a frequency which is not less than a frequency half the rotation speed of the internal combustion engine. These modifications are based on the fact that in a case where one cylinder undergoes an engine misfire, a variation in the rotation based on the cylinder undergoing an engine misfire corresponds to a frequency half the rotation speed of the internal combustion engine and that components due to resonance can be removed by cutting a frequency region that is not more than the vicinity of this frequency.

Additionally, in the first engine misfire identification device for an internal combustion engine of the present invention in an aspect based on the use of a high-pass filter as this second technique, the second technique may be a technique for identifying an engine misfire on the basis of a variation in the rotation speed after filtering, which is obtained by applying a high-pass filter to the computed unit rotation-angle rotation speed, the high-pass filter being obtained by changing, according to the rotation speed of the internal combustion engine, a prescribed number of high-pass filters in which the frequency attenuation of explosive combustion of the internal combustion engine is small, but the frequency attenuation obtained by dividing the frequency of the explosive combustion by the number of cylinders is large. Accordingly, it is possible to make the high-pass filter suitable for the rotation speed of an internal combustion engine by changing a prescribed number of high-pass filters. In this case, the second technique may also be a technique for identifying an engine misfire on the basis of a variation in the rotation speed after filtering, which is obtained by applying, to the computed unit rotation-angle rotation speed, a high-pass filter having the tendency that the larger the rotation speed of the internal combustion engine, the smaller the prescribed number of high-pass filters. Furthermore, in this case, the second technique may also be a module that identifies an engine misfire on the basis of a variation in the rotation speed after filtering, which is obtained by applying, to the computed unit rotation-angle rotation speed, a high-pass filter that is constituted by a first number of high-pass filters as the prescribed high-pass filter in a case where the rotation speed of the internal combustion engine is less than a first rotation speed, and identifies an engine misfire on the basis of a variation in the rotation speed after filtering, which is obtained by applying, to the computed unit rotation-angle rotation speed, a high-pass filter that is constituted by a second number of filters smaller than the first number of filters as the prescribed high-pass filter in a case where the rotation speed of the internal combustion engine is equal to or more than the first rotation speed and less than the second rotation speed larger than the first rotation speed.

Moreover, in the first engine misfire identification device for an internal combustion engine of the present invention in an aspect based on the use of a high-pass filter as this second technique, the second technique may be a technique for identifying an engine misfire on the basis of a variation in the rotation speed after filtering, which is obtained by applying, to the computed unit rotation-angle rotation speed, a high-pass filter suitable for a resonance period relationship, which is a relationship between the rotation of the internal combustion engine and the period of resonance occurring on the basis of the torsion of the torsion element. Accordingly, a suitable high-pass filter is used depending on the resonance period relationship, which is a relationship between the rotation of an internal combustion engine and the period of resonance occurring on the basis of the torsion of a torsion element. Therefore, it is possible to obtain a rotation speed after filtering, from which the effect of resonance occurring on the basis of the torsion of a torsion element is more reliably removed, and it is possible to identify an engine misfire in an internal combustion engine with better accuracy. In this case, the second technique may be such that an identification is made on an engine misfire on the basis of a variation in the rotation speed after filtering, which is obtained by applying, to the computed unit rotation-angle rotation speed, a first high-pass filter, in which the attenuation of the frequency of explosive combustion of the internal combustion engine is small, but the attenuation of the frequency obtained by dividing the frequency of the explosive combustion by the number of cylinders and multiplying the divided frequency by 2 is large when the period of the resonance is one rotation of the internal combustion engine as the resonance period relationship, and an identification is made on an engine misfire on the basis of a variation in the rotation speed after filtering, which is obtained by applying, to the computed unit rotation-angle rotation speed, a second high-pass filter, in which the attenuation of the frequency of explosive combustion of the internal combustion engine is small, but the attenuation of the frequency obtained by dividing the frequency of the explosive combustion by the number of cylinders is large when the period of the resonance is two rotations of the internal combustion engine as the resonance period relationship. Furthermore, in this case, the first high-pass filter may be constituted by a first number of prescribed high-pass filters, in which the attenuation of the frequency of explosive combustion of the internal combustion engine is small, but the attenuation of the frequency obtained by dividing the frequency of the explosive combustion by the number of cylinders is large, and in that the second high-pass filter is constituted by a second number of the prescribed high-pass filters smaller than the first number of high-pass filters.

Alternatively, in the first engine misfire identification device for an internal combustion engine of the present invention in an aspect based on the use of a high-pass filter as the second technique, the above-described second technique may also be a technique in which an engine misfire is identified to have occurred when an amount of variation in the above-described rotation speed after filtering is less than an amount of variation in a threshold value. This is based on the fact that a variation in the rotation due to a cylinder undergoing an engine misfire is reduced by high-pass filtering. In this case, the above-described second technique may also be a technique for identifying an engine misfire by using an amount of variation in a threshold value suitable for an output torque of the above-described internal combustion engine. Accordingly, it is possible to identify an engine misfire according to an output torque of the internal combustion engine more reliably and with good accuracy.

In the first engine misfire identification device for an internal combustion engine of the present invention in whichever embodiment of these, an engine misfire may be identified by using a unit rotation-angle angular velocity, which is a rotation angular velocity for each prescribed unit rotation angle of an output shaft of the internal combustion engine, in place of the unit rotation-angle rotation speed. Because the unit rotation-angle rotation speed can be converted into the unit rotation-angle angular velocity only by being multiplied by a coefficient, an engine misfire in an internal combustion engine can be similarly identified with good accuracy also by using the unit rotation-angle angular velocity in place of the unit rotation-angle rotation speed.

The present invention is directed to a second engine misfire identification device for an internal combustion engine that identifies an engine misfire for a multiple-cylinder internal combustion engine in which an output shaft is connected to a rear portion via a torsion element, the engine misfire identification device includes:

a rotation position detection unit that detects a rotation position of an output shaft of the internal combustion engine, a unit rotation-angle angular velocity computation unit that computes a unit rotation-angle angular velocity, which is a rotation angular velocity for each prescribed unit rotation angle of the output shaft of the internal combustion engine, based on the detected rotation position, and an engine misfire identification unit that makes an identification as to whether or not any one of cylinders of the internal combustion engine undergoes an engine misfire by using a first technique for the computed unit rotation-angle angular velocity, when the drive point of the internal combustion engine does not belong to a resonance region of a rear portion including the torsion element, and makes an identification as to whether or not any one of cylinders of the internal combustion engine undergoes an engine misfire by using a second technique, which is different from the first technique, for the computed unit rotation-angle angular velocity, when the drive point of the internal combustion engine belongs to the resonance region.

In the second misfire identification device for an internal combustion engine of the present invention, when the drive point of a multiple-cylinder internal combustion engine does not belong to a resonance region of a rear portion including a torsion element that connects the internal combustion engine to the rear portion, an identification is made as to whether or not any one of cylinders of the internal combustion engine undergoes an engine misfire by using a first technique for a unit rotation-angle angular velocity, which is a rotation angular velocity for each prescribed unit rotation angle of an output shaft of an internal combustion engine and is computed on the basis of the rotation position of the output shaft of the internal combustion engine. When the drive point of the internal combustion engine belongs to a resonance region, an identification is made as to whether or not any one of cylinders of the internal combustion engine undergoes an engine misfire by using a second technique different from the first technique for a unit rotation-angle angular velocity. In this manner, by changing identification techniques depending on whether or not the drive point of an internal combustion engine belongs to a resonance region of a rear portion including a torsion element that connects the internal combustion engine to the rear portion, it is possible to identify an engine misfire more reliably and with good accuracy when the drive point of an internal combustion engine belongs to a resonance region.

In the second engine misfire identification device for an internal combustion engine of the present invention, the first technique may be a technique for identifying an engine misfire on the basis of the computed unit rotation-angle angular velocity, and in that the second technique may be a technique for identifying an engine misfire on the basis of an angular velocity after filtering that is obtained by applying a high-pass filter that cuts a low-frequency region for the computed unit rotation-angle angular velocity.

In the second engine misfire identification device for an internal combustion engine of the present invention in an aspect based on the use of a high-pass filter as this second technique, the second technique may be a technique for identifying an engine misfire by subjecting the angular velocity after filtering to identification processing for high loads when the internal combustion engine is operating under a high load of not less than a prescribed load, and for identifying an engine misfire by subjecting the angular velocity after filtering to identification processing for low loads different from the identification processing for high loads when the internal combustion engine is operating under a low load of less than the prescribed load. Accordingly, even in a case where the internal combustion engine is operating under a high load of not less than a prescribed load when the drive point of the internal combustion engine belongs to a resonance region or even in a case where the internal combustion engine is operating under a low load of less than the prescribed load, it is possible to more appropriately identify an engine misfire in the internal combustion engine.

As the second technique, in the second engine misfire identification device for an internal combustion engine of the present invention in an aspect based on making an identification on an engine misfire by changing processing depending on the load of the internal combustion engine, the above-described identification processing for high loads may also be processing for identifying an engine misfire on the basis of an identification parameter for high loads, which is obtained by integrating an absolute value of a differentiated value of the above-described angular velocity after filtering in a first prescribed range. In this case, the above-described first prescribed range may also be a first prescribed crank angle range, which is included between a top dead center in the compression stroke of a cylinder in question among the above-described plurality of cylinders and a top dead center in the compression stroke of the next cylinder of the cylinder in question. The above-described identification processing for high loads may also be processing for identifying that an engine misfire has occurred when the above-described identification parameter for high loads is less than the above-described prescribed value for high loads. These modifications enable an engine misfire in an internal combustion engine to be identified with good accuracy when the drive point of the internal combustion engine belongs to a resonance region and the internal combustion engine is operating under a high load.

Additionally, as the second technique, in the second engine misfire identification device for an internal combustion engine of the present invention in an aspect based on making an identification on an engine misfire by changing processing depending on the load of the internal combustion engine, the above-described identification processing for low loads may also be processing for identifying an engine misfire on the basis of an identification parameter for low loads, which is obtained by integrating the above-described angular velocity after filtering in a second prescribed range. In this case, the above-described second prescribed range may also be a first prescribed crank angle range, which is included between a top dead center in the compression stroke of a cylinder in question among the above-described plurality of cylinders and a top dead center in the compression stroke of the next cylinder of the cylinder in question. The above-described identification processing for low loads may also be processing for identifying that an engine misfire has occurred when the above-described identification parameter for low loads is less than the above-described prescribed value for low loads.

These modifications enable an engine misfire in an internal combustion engine to be identified with good accuracy when the drive point of the internal combustion engine belongs to a resonance region and the internal combustion engine is operating under a low load.

Furthermore, as the second technique, in the second engine misfire identification device for an internal combustion engine of the present invention in an aspect based on making an identification on an engine misfire by changing processing depending on the load of the internal combustion engine, the second technique may be a technique for identifying an engine misfire by performing the identification processing for low loads regardless of the load of the internal combustion engine when the internal combustion engine is warming up in order to activate a catalyst included in a purifier that purifies exhaust gases of the internal combustion engine. Accordingly, it is possible to identify an engine misfire in an internal combustion engine with good accuracy when the drive point of the internal combustion engine belongs to a resonance region and the internal combustion engine is warming up in order to activate a catalyst of the internal combustion engine.

In the second engine misfire identification device for an internal combustion engine of the present invention in an aspect based on the use of a high-pass filter as this second technique, the second technique may be a technique that involves computing a component of influence exerted by a reciprocal mass inertia torque, which is based on the inertia of parts that perform a reciprocating motion among torques output from the internal combustion engine, upon the rotation angular velocity of an output shaft of the internal combustion engine, and identifying an engine misfire by using an identification angular velocity, which is obtained by subtracting the computed component of influence from the angular velocity after filtering. Accordingly, an engine misfire is identified by use of an identification angular velocity obtained by subtracting a component of influence that is exerted by a reciprocal mass inertia torque, which is based on the inertia of parts that perform a reciprocating motion, from the angular velocity after filtering, whereby an identification is made on an engine misfire by causing the influence of a torque associated with the pressure in a cylinder, such as the explosive combustion and engine misfire of an internal combustion engine, to manifest itself. Therefore, it is possible to make an identification with better accuracy on an engine misfire in an internal combustion engine when the drive point of the internal combustion engine belongs to a resonance region. In this case, the reciprocal mass inertia torque may be expressed by the following formula, where the summation of the mass of reciprocating parts is M, the angle from a reference position for the rotation position of an output shaft of the internal combustion engine is θ, the projected area of a top surface of a piston of the internal combustion engine is A, the rotation angular velocity of an output shaft of the internal combustion engine is ω, and the volume within the cylinder of the internal combustion engine is expressed by V (θ) as a function of the angle θ of the rotation position of the output shaft.

reciprocal mass inertia torque $Tp =$ $$\left(\frac{180}{\pi}\right)^3 \times \frac{M}{A^2} \times \omega \times \frac{dV(\theta)}{d\theta}\left(\omega \times \frac{d^2V(\theta)}{d\theta^2} + \frac{d\omega}{d\theta} \times \frac{dV(\theta)}{d\theta}\right)$$

In the second engine misfire identification device for an internal combustion engine of the present invention in whichever embodiment of these, an identification may be made on an engine misfire by using a unit rotation-angle rotation speed, which is a rotation speed for each prescribed unit rotation angle of an output shaft of the internal combustion engine, in place of the unit rotation-angle angular velocity. Because the unit rotation-angle angular velocity can be converted into the unit rotation-angle rotation speed only by being multiplied by a coefficient, an engine misfire in an internal combustion engine can be similarly identified with good accuracy also by using the unit rotation-angle rotation speed in place of the unit rotation-angle angular velocity.

In the gist of the present invention, a vehicle of the invention includes a multiple-cylinder internal combustion engine in which an output shaft is connected to a rear portion via a damper as a torsion element provided on the axle side, and the first or second engine misfire identification device for an internal combustion engine of the present invention in any one of the above-described aspects, for identifying an engine misfire in the internal combustion engine. Accordingly, a vehicle of the present invention can produce advantages similar to the advantages produced by the first or second engine misfire identification device for an internal combustion engine of the present invention, for example, the advantage that it is possible to identify an engine misfire more reliably and with good accuracy even when the drive point of an internal combustion engine belongs to a resonance region. A transmission mechanism and the like are included in the rear portion of a damper.

The vehicle of the present invention may include an electric power-mechanical power input/output mechanism, which is connected to a damper shaft connected to the damper on the rear portion side of the damper and a drive shaft connected to the axle side, and inputs and outputs mechanical power to and from the damper shaft and the drive shaft, with the input and output of electric power and mechanical power involved, and an electric motor that inputs and outputs mechanical power to and from the drive shaft. In this case, even when damping control is performed to suppress the vibrations associated with a torque variation on the axle side due to an electric power-mechanical power input/output mechanism and an electric motor, it is possible to identify an engine misfire in an internal combustion engine with good accuracy.

The present invention is directed to a first engine misfire identification method for an internal combustion engine that identifies an engine misfire in a multiple-cylinder internal combustion engine in which an output shaft is connected to a rear portion via a torsion element. The engine misfire identification method includes: computing a unit rotation-angle rotation speed, which is a rotation speed for each prescribed unit rotation angle of the output shaft of the internal combustion engine, on the basis of a rotation position of the output shaft of the internal combustion engine, making an identification as to whether or not any one of cylinders of the internal combustion engine undergoes an engine misfire by using a first technique for the computed unit rotation-angle rotation speed, when the drive point of the internal combustion engine does not belong to a resonance region of a rear portion including the torsion element, and making an identification as to whether or not any one of cylinders of the internal combustion engine undergoes an engine misfire by using a second technique, which is different from the first technique, for the computed unit rotation-angle rotation speed, when the drive point of the internal combustion engine belongs to the resonance region.

In the first engine misfire identification method for an internal combustion engine of the present invention, when the drive point of a multiple-cylinder internal combustion engine does not belong to a resonance region of a rear portion including a torsion element that connects the internal combustion engine to the rear portion, an identification is made as to whether or not any one of cylinders of the internal combustion engine undergoes an engine misfire by using a first technique for a unit rotation-angle rotation speed, which is a rotation speed for each prescribed unit rotation angle of an output shaft of an internal combustion engine and is computed on the basis of the rotation position of the output shaft of the internal combustion engine. When the drive point of the internal combustion engine belongs to a resonance region, an identification is made as to whether or not any one of cylinders of the internal combustion engine undergoes an engine misfire by using a second technique different from the first technique for a unit rotation-angle rotation speed. In this manner, by changing identification techniques depending on whether or not the drive point of an internal combustion engine belongs to a resonance region of a rear portion including a torsion element that connects the internal combustion engine to the rear portion, it is possible to identify an engine misfire more reliably and with good accuracy when the drive point of an internal combustion engine belongs to a resonance region.

In the first engine misfire identification method for an internal combustion engine of the present invention, the first technique may be a technique for identifying an engine misfire on the basis of a variation in the computed unit rotation-angle rotation speed, and in that the second technique may be a technique for identifying an engine misfire on the basis of a variation in a rotation speed after filtering that is obtained by applying a high-pass filter that cuts a low-frequency region for the computed unit rotation-angle rotation speed.

In the first engine misfire identification method for an internal combustion engine of the present invention in an aspect based on the use of a high-pass filter as this second technique, the second technique may be a technique for identifying an engine misfire on the basis of a variation in the rotation speed after filtering, which is obtained by applying a high-pass filter to the computed unit rotation-angle rotation speed, the high-pass filter being obtained by changing, according to the rotation speed of the internal combustion engine, a prescribed number of high-pass filters in which the frequency attenuation of explosive combustion of the internal combustion engine is small, but the frequency attenuation obtained by dividing the frequency of the explosive combustion by the number of cylinders is large. Accordingly, it is possible to make the high-pass filter suitable for the rotation speed of an internal combustion engine by changing a prescribed number of high-pass filters.

Additionally, in the first engine misfire identification method an internal combustion engine of the present invention in an aspect based on the use of a high-pass filter as this second technique, the second technique may be a technique for identifying an engine misfire on the basis of a variation in the rotation speed after filtering, which is obtained by applying, to the computed unit rotation-angle rotation speed, a high-pass filter suitable for a resonance period relationship, which is a relationship between the rotation of the internal combustion engine and the period of resonance occurring on the basis of the torsion of the torsion element. Accordingly, a suitable high-pass filter is used depending on the resonance period relationship, which is a relationship between the rotation of an internal combustion engine and the period of resonance occurring on the basis of the torsion of a torsion element. Therefore, it is possible to obtain a rotation speed after filtering, from which the effect of resonance occurring on the basis of the torsion of a torsion element is more reliably removed, and it is possible to identify an engine misfire in an internal combustion engine with better accuracy.

The present invention is directed to a second engine misfire identification method for an internal combustion engine that identifies an engine misfire in a multiple-cylinder internal combustion engine in which an output shaft is connected to a rear portion via a torsion element. The engine misfire identification method includes: computing a unit rotation-angle angular velocity, which is a rotation angular velocity for each prescribed unit rotation angle of the output shaft of the internal combustion engine, on the basis of a rotation position of the output shaft of the internal combustion engine, making an identification as to whether or not any one of cylinders of the internal combustion engine undergoes an engine misfire by using a first technique for the computed unit rotation-angle angular velocity, when the drive point of the internal combustion engine does not belong to a resonance region of a rear portion including the torsion element, and making an identification as to whether or not any one of cylinders of the internal combustion engine undergoes an engine misfire by using a second technique, which is different from the first technique, for the computed unit rotation-angle angular velocity, when the drive point of the internal combustion engine belongs to the resonance region.

In the second engine misfire identification method for an internal combustion engine of the present invention, when the drive point of a multiple-cylinder internal combustion engine does not belong to a resonance region of a rear portion including a torsion element that connects the internal combustion engine to the rear portion, an identification is made as to whether or not any one of cylinders of the internal combustion engine undergoes an engine misfire by using a first technique for a unit rotation-angle angular velocity, which is a rotation angular velocity for each prescribed unit rotation angle of an output shaft of an internal combustion engine and is computed on the basis of the rotation position of the output shaft of the internal combustion engine. When the drive point of the internal combustion engine belongs to a resonance region, an identification is made as to whether or not any one of cylinders of the internal combustion engine undergoes an engine misfire by using a second technique different from the first technique for a unit rotation-angle angular velocity. In this manner, by changing identification techniques depending on whether or not the drive point of an internal combustion engine belongs to a resonance region of a rear portion including a torsion element that connects the internal combustion engine to the rear portion, it is possible to identify an engine misfire more reliably and with good accuracy when the drive point of an internal combustion engine belongs to a resonance region.

In the second engine misfire identification method for an internal combustion engine of the present invention, the first technique may be a technique for identifying an engine misfire on the basis of the computed unit rotation-angle angular velocity, and in that the second technique may be a technique for identifying an engine misfire on the basis of a angular velocity after filtering that is obtained by applying a high-pass filter that cuts a low-frequency region for the computed unit rotation-angle angular velocity.

In the second engine misfire identification method for an internal combustion engine of the present invention in an aspect based on the use of a high-pass filter as this second technique, the second technique may be a technique for making an identification on an engine misfire on the basis of an identification parameter for high loads, which is obtained by integrating an absolute value of a differentiated value of the angular velocity after filtering in a first prescribed range, when the internal combustion engine is operating under a high load of not less than a prescribed load, and an identification is made on an engine misfire on the basis of an identification parameter for low loads, which is obtained by integrating the angular velocity after filtering in a second prescribed range, when the internal combustion engine is operating under a low load of less than the prescribed load. Accordingly, even in a case where the internal combustion engine is operating under a high load of not less than a prescribed load when the drive point of the internal combustion engine belongs to a resonance region or even in a case where the internal combustion engine is operating under a low load of less than the prescribed load, it is possible to more appropriately identify an engine misfire in the internal combustion engine.

Additionally, in the second engine misfire identification method for an internal combustion engine of the present invention in an aspect based on the use of a high-pass filter as this second technique, the second technique may be a technique that involves computing a component of influence exerted by a reciprocal mass inertia torque, which is based on the inertia of parts that perform a reciprocating motion among torques output from the internal combustion engine, upon the rotation angular velocity of an output shaft of the internal combustion engine, and identifying an engine misfire by using an identification angular velocity, which is obtained by subtracting the computed component of influence from the angular velocity after filtering. Accordingly, an engine misfire is identified by use of an identification angular velocity obtained by subtracting a component of influence that is exerted by a reciprocal mass inertia torque, which is based on the inertia of parts that perform a reciprocating motion, from the angular velocity after filtering, whereby an identification is made on an engine misfire by causing the influence of a torque associated with the pressure in a cylinder, such as the explosive combustion and engine misfire of an internal combustion engine, to manifest itself. Therefore, it is possible to make an identification with better accuracy on an engine misfire in an internal combustion engine when the drive point of the internal combustion engine belongs to a resonance region.

BEST MODE FOR CARRYING OUT THE INVENTION

One mode of carrying out the invention is described below as a preferred embodiment.

Figure 1:
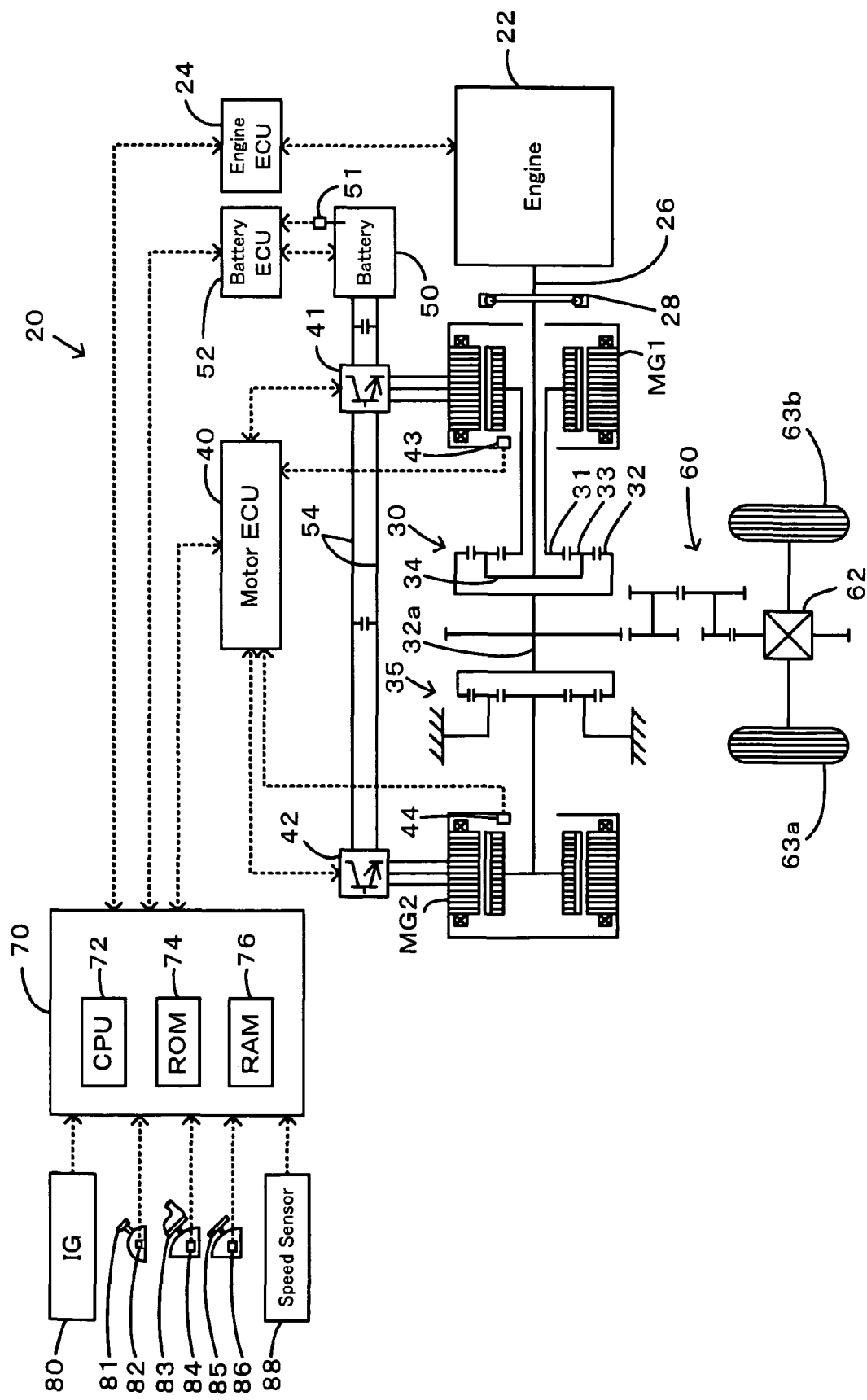
FIG. 1 is a block diagram showing a general configuration of a hybrid vehicle 20, which is an embodiment of the present invention.

FIG. 1 schematically illustrates the construction of a hybrid vehicle 20 with an engine misfire identification device for an internal combustion engine mounted thereon as the first embodiment of the invention. As illustrated, the hybrid vehicle 20 of the first embodiment includes an engine 22, a three shaft-type power distribution integration mechanism 30 that is linked with a crankshaft 26 functioning as an output shaft of the engine 22 via a damper 28 as a torsion element, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole vehicle. In this hybrid vehicle, an engine misfire identification device for an internal combustion engine in the first embodiment corresponds to an engine electronic control unit 24 that mainly controls the engine 22.

Figure 2:
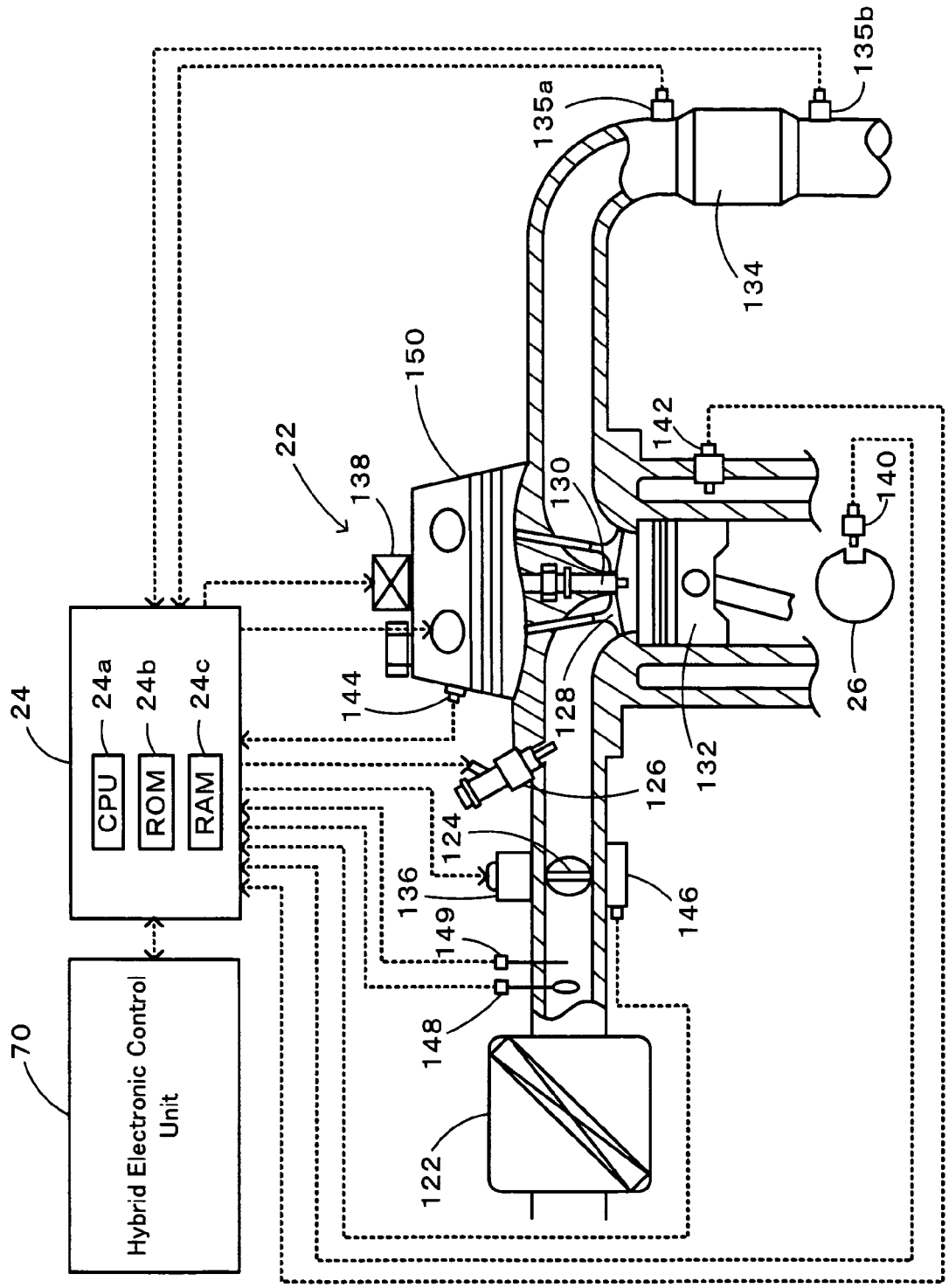
FIG. 2 is a block diagram showing a general configuration of an engine 22.

The engine 22 is a six-cylinder internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 which is set in each cylinder to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 26. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit 24 (hereafter referred to as engine ECU 24). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port (not shown), signals from various sensors that measure and detect the conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal AF from an air flow meter 148 attached to an air intake conduit, an intake air temperature from a temperature sensor 149 attached to the air intake conduit, an air-fuel ratio AF from an air-fuel ratio sensor 135a and an oxygen signal from an oxygen sensor 135b. The engine ECU 24 outputs, via its output port (not shown), diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements. Incidentally, the above-described crank position sensor 140 is formed as an electromagnetic pickup sensor having a timing rotor that is attached so as to rotate in synchronization with the rotation of the crankshaft 26, and has teeth formed at intervals of 10 degrees and a portion free from two teeth for the detection of a reference position, and this crank position sensor causes a shaped wave to be generated each time the crankshaft 26 rotates through 10 degrees.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the first embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
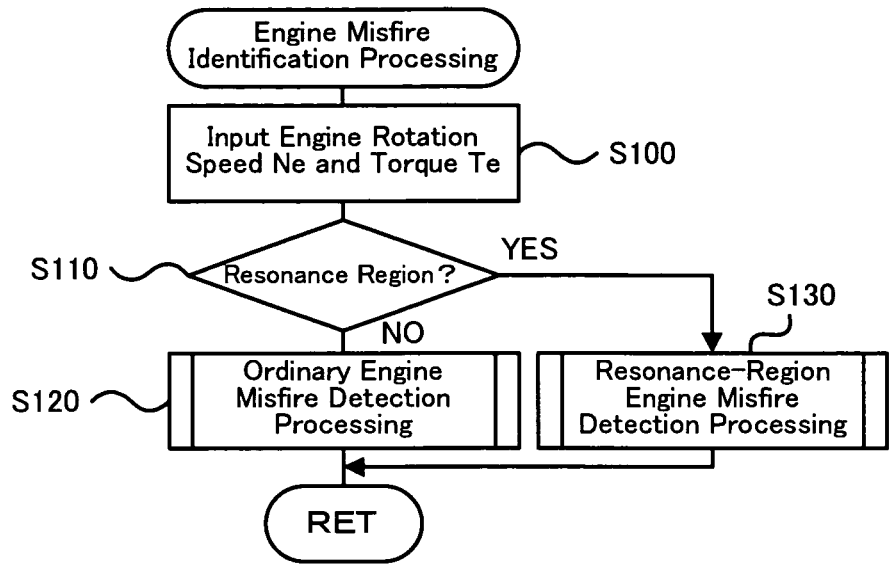
FIG. 3 is a flowchart showing an example of engine misfire identification processing executed by an engine ECU 24.

Next, a description will be given of an action to be taken in making an identification as to whether or not any one of cylinders of the engine 22 mounted on the hybrid vehicle 20 of the first embodiment, which is constructed as described above, undergoes an engine misfire. FIG. 3 is a flowchart showing an example of engine misfire identification processing routine executed by the engine ECU 24. This routine is repeatedly executed at prescribed time intervals.

In the execution of engine misfire identification processing, the CPU 24a of the engine ECU 24 first inputs the rotation speed Ne and the torque Te of the engine 22 (Step S100), and executes processing to identify whether or not the operating condition of the engine 22 belongs to a resonance region of a rear portion including the damper 28 (the power distribution and integration mechanism 30 and the like) on the basis of the input rotation speed Ne and torque Te (Step S110). In the first embodiment, for the rotation speed Ne of the engine 22, a value found by a computation on the basis of the crank angle CA from the crank position sensor 140 is input, and for the torque Te, a value calculated from the torque command Tm1* of the motor MG1 and the rotation speed Ne of the engine 22 is input. As to whether or not the operating condition of the engine 22 belongs to a resonance region of a rear portion including the damper 28, there is adopted a method which is such that the rotation speed Ne and the torque Te of the engine 22, which constitute a resonance region, are found beforehand in an experiment and the like, and stored as a resonance operation range in the ROM 24b, and an identification is made as to whether or not the input rotation speed Ne and the torque Te of the engine 22 belong to the stored resonance operation range. Incidentally, the resonance operation range can be found by an experiment from the characteristics of the engine 22 and the characteristics of a rear portion behind the damper 28 (power distribution and integration mechanism 30) and the like.

Figure 4:
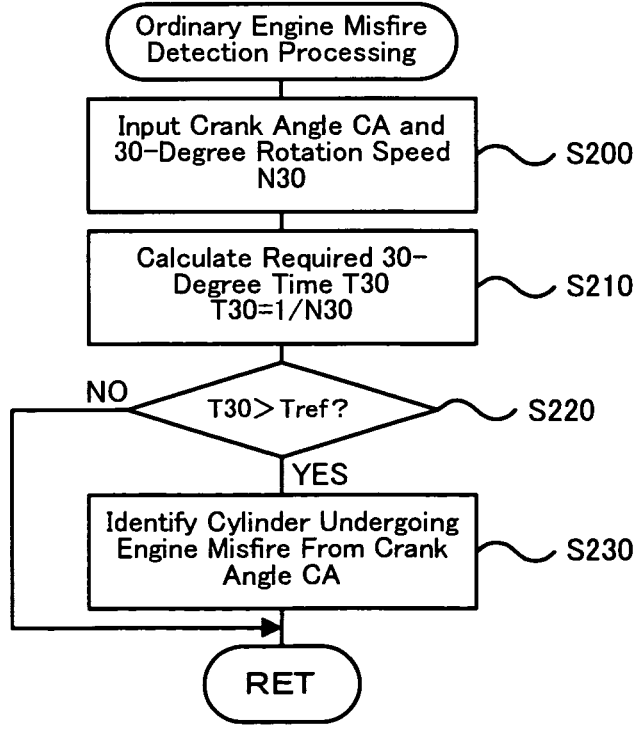
FIG. 4 is a flowchart showing an example of ordinary engine misfire detection processing.

When it has been identified at Step S110 that the operating condition of the engine 22 is not in a resonance region of a rear portion including the damper 28, in the ordinary engine misfire detection processing schematically represented in FIG. 4, engine misfire detection is performed as to whether or not any one of the cylinders of the engine 22 undergoes an engine misfire (Step S120). When it has been identified that the operating condition of the engine 22 is in a resonance region of a rear portion including the damper 28, in the resonance-region engine misfire detection processing shown in FIG. 5, engine misfire detection is performed to find out whether or not any one of the cylinders of the engine 22 undergoes an engine misfire (Step S130) and the engine misfire identification processing is finished.

Figure 6:
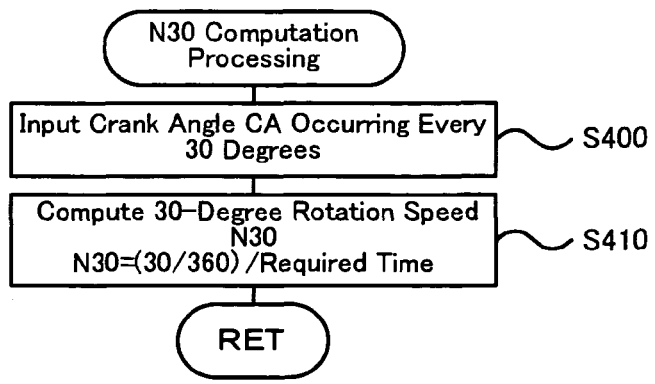
FIG. 6 is a flowchart showing an example of the computation of a 30-degree rotation speed N30.
Figure 7:
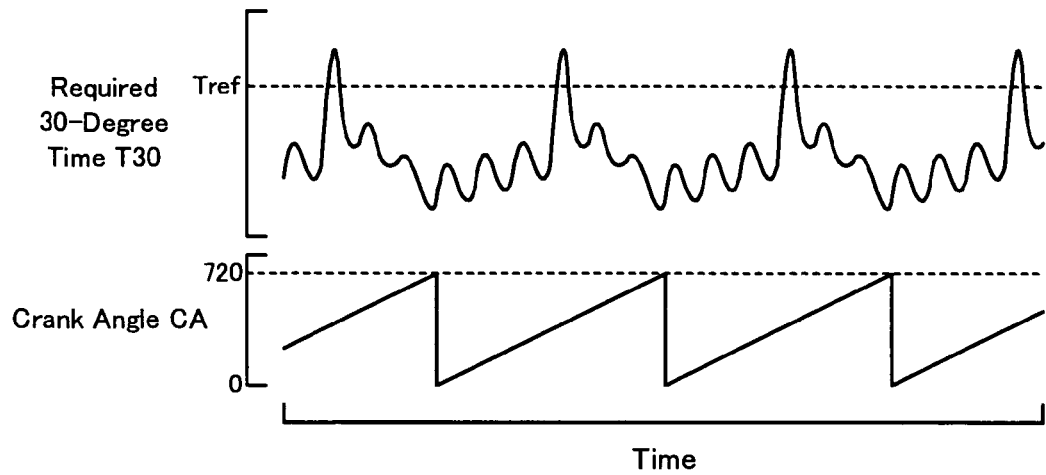
FIG. 7 is an explanatory diagram showing an example of changes with time in required 30-degree rotation time T30 of an engine 22 in which one cylinder undergoes an engine misfire and a crank angle CA in a case where the operating condition of the engine 22 is not in a resonance region.

In the ordinary engine misfire detection processing of FIG. 4, first, the crank angle CA detected by the crank position sensor 140 is input, a 30-degree rotation speed N30, which is a rotation speed computed in the N30 computation processing schematically represented in FIG. 6 and occurs each time the crank angle CA becomes 30 degrees, is simultaneously input (Step S200), and a required 30-degree rotation time T30, which is required by the crankshaft 26 in rotating through 30 degrees, is calculated by taking an inverse number of the input 30-degree rotation speed N30 (Step S210). At this step, as shown in the N30 computation processing, the 30-degree rotation speed N30 can be found by inputting a crank angle CA occurring every 30 degrees from a reference crank angle (Step S400) and dividing 30 degrees by the time required to rotate through 30 degrees (Step S410). Next, an identification is made as to whether or not the required 30-degree rotation time T30 is larger than a threshold value Tref (Step S220). When the required 30-degree rotation time T30 is larger than a threshold value Tref, it is identified that an engine misfire has occurred, a cylinder undergoing an engine misfire is identified on the basis of the input crank angle CA (Step S230), and the ordinary engine misfire identification processing is finished. In this connection, the threshold value Tref is set as a value that is larger than the required 30-degree rotation time T30 that elapses when a cylinder that is in the combustion stroke at a crank angle CA, which provides a reference for the required 30-degree rotation time T30, does not undergo an engine misfire, and is smaller than the required 30-degree rotation time T30 when the cylinder undergoes an engine misfire. The threshold value Tref can be found in an experiment and the like. It is possible to identify a cylinder undergoing an engine misfire as a cylinder that is in the combustion stroke at a crank angle CA, which provides a reference for the required 30-degree rotation time T30 over the threshold value Tref. FIG. 7 shows an example of changes with time in the required 30-degree rotation time T30 and crank angle CA of the engine 22 in which one cylinder undergoes an engine misfire when the operating condition of the engine 22 is not in a resonance region. As graphically represented, the required 30-degree rotation time T30 exceeds the threshold value Tref at every 720 degrees of crank angle CA. Incidentally, when the required 30-degree rotation time T30 is not more than the threshold value Tref, it is identified that no engine misfire has occurred and the ordinary engine misfire detection processing is finished.

Figure 5:
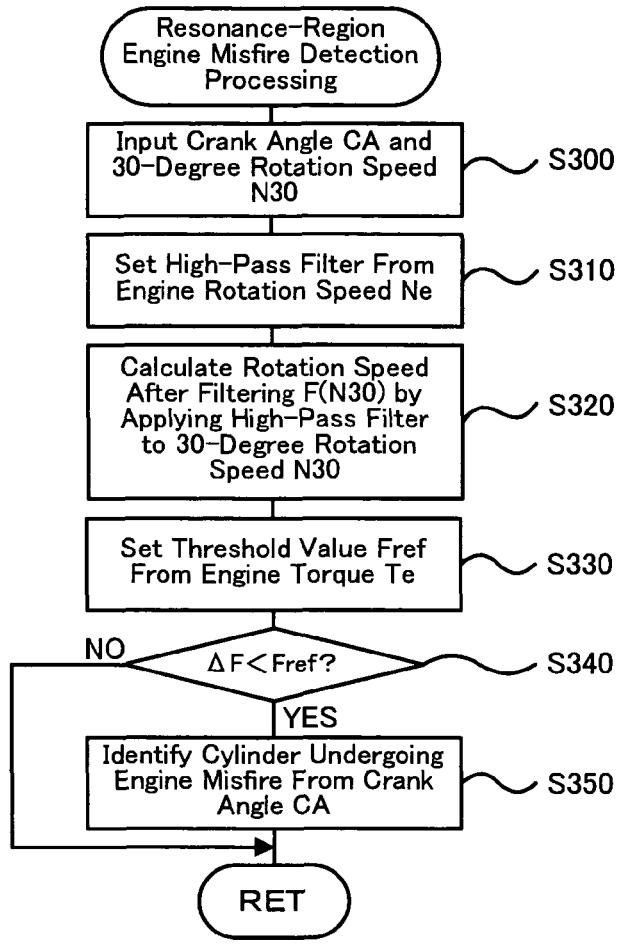
FIG. 5 is a flowchart showing an example of resonance-region engine misfire detection processing.
Figure 8:
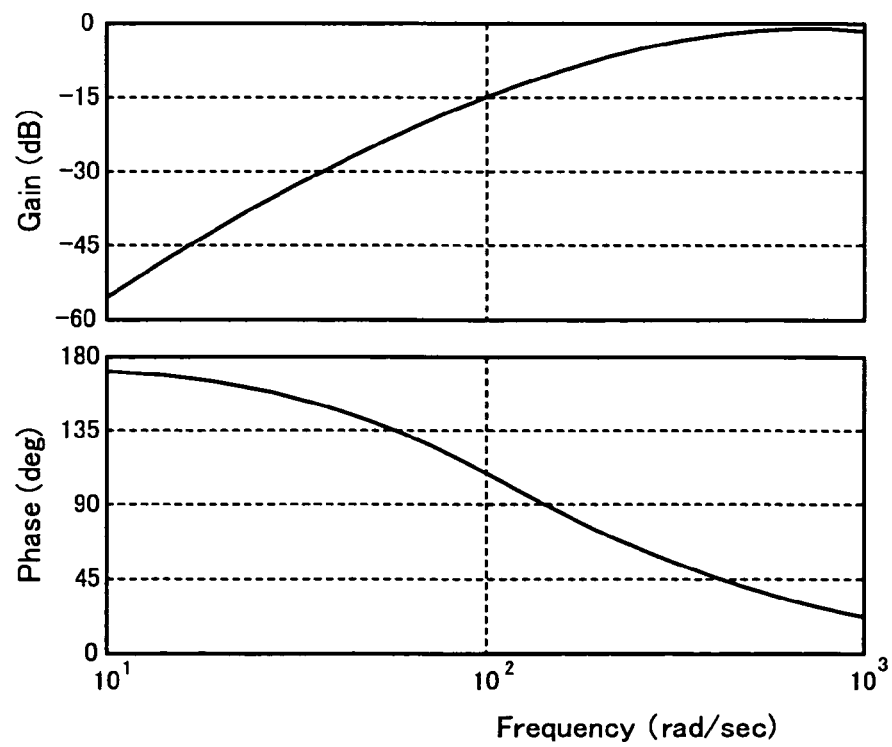
FIG. 8 is an explanatory diagram showing an example of a Bode plot of a high-pass filter.

In the resonance-region engine misfire detection processing of FIG. 5, first, the crank angle CA detected by the crank position sensor 140 is input, and a 30-degree rotation speed N30, which is a rotation speed computed in the N30 computation processing schematically represented in FIG. 6 and occurring each time when the crank angle CA becomes 30 degrees, is simultaneously input (Step S300). And a high-pass filter is set on the basis of the rotation speed Ne of the engine 22 (Step S310) and a rotation speed after filtering F (N30) is obtained by applying the high-pass filter set at the 30-degree rotation speed N30 (Step S320). In this connection, the reason why a high-pass filter is applied is that because the resonance frequency occurring when one cylinder undergoes an engine misfire becomes an engine misfire frequency, i.e., a frequency corresponding to the period of time required by the crankshaft 26 in rotating through 720 degrees (a frequency half the rotation speed Ne of the engine 22), in the 6-cylinder engine 22 that executes the combustion stroke each time the crankshaft 26 rotates through 120 degrees, by allowing a frequency corresponding to this period to pass through and simultaneously cutting the resonance frequency, the effect of the resonance is removed from changes in the 30-degree rotation speed N30. In the first embodiment, a high-pass filter of a transfer function G shown in the following equation (1) was used. An example of a Bode plot of the high-pass filter used in the first embodiment is shown in FIG. 8. As the characteristics of a high-pass filter, it is necessary only that designing be performed so that the gain of a resonance frequency is sufficiently reduced. Therefore, it is necessary only that the time required by the crankshaft 26 in rotating through 720 degrees be found from the rotation speed Ne of the engine 22 and that a cut-off frequency be set so that a frequency having this time as the period is sufficiently cut.

$$G(s) = \frac{T^2 s^2}{T^2 s^2 + 2Ts + 1} \quad (1)$$

Figure 9:
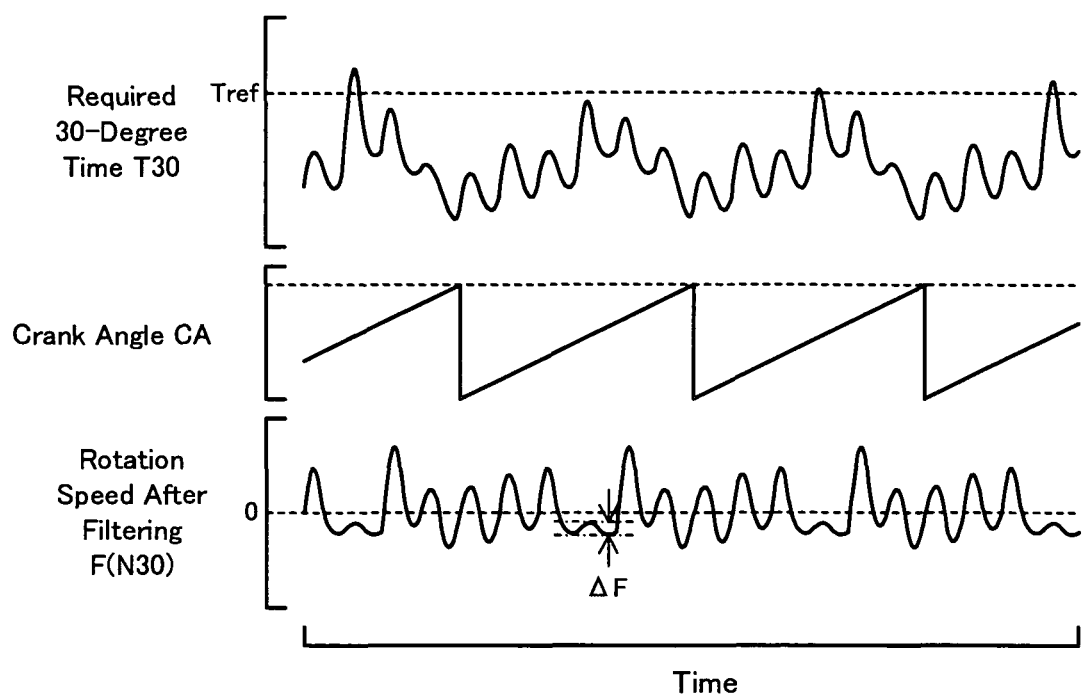
FIG. 9 is an explanatory diagram showing an example of changes with time in the required 30-degree rotation time T30 of an engine 22 in which one cylinder undergoes an engine misfire, a crank angle CA and a rotation speed after filtering F (N30) when the operating condition of the engine 22 belongs to a resonance region.

Subsequently, the threshold value Fref is set on the basis of the torque Te of the engine 22 (Step S330) and an identification is made as to whether or not a variation ΔF, which is a difference between trough and crest in a change in the rotation speed after filtering F (N30), is less than the set threshold value Fref (Step S340). When the variation ΔF is less than the threshold value Fref, it is identified that an engine misfire has occurred, a cylinder undergoing the engine misfire is identified on the basis of the input crank angle CA (Step S350), and the resonance-region engine misfire detection processing is finished. In this connection, the threshold value Fref is set as a value that is smaller than a variation in the rotation speed after filtering F (N30) that occurs when a cylinder that is in the combustion stroke at a crank angle CA, which provides a reference for the 30-degree rotation speed N30, does not undergo an engine misfire, and is larger than the variation in the rotation speed after filtering F (N30) that occurs when the cylinder undergoes an engine misfire. The threshold value Fref can be found by an experiment and the like. In the first embodiment, there is adopted a method which is such that the relationship between the torque Te of the engine 22 and the threshold value Tref is found beforehand in an experiment and the like and stored as a map in the ROM 24b and that when the torque Te is given, a corresponding threshold value Fref is derived from the stored map and set. FIG. 9 shows an example of changes with time in the required 30-degree rotation time T30 of an engine 22 in which one cylinder undergoes an engine misfire, a crank angle CA and a rotation speed after filtering F (N30) when the operating condition of the engine 22 is in a resonance region. As graphically represented, an engine misfire is satisfactorily detected in the rotation speed after filtering F (N30), from which the effect of the resonance is removed. Incidentally, when the variation ΔF in the rotation speed after filtering F (N30) is not more than the threshold value Fref, it is identified that no engine misfire has occurred and the resonance-region engine misfire detection processing is finished.

According to the above-described engine misfire identification device for an internal combustion engine that is mounted on the hybrid vehicle 20 of the first embodiment, an engine misfire is identified in the ordinary engine misfire detection processing when the operating condition of the engine 22 does not belong to a resonance region of a rear portion including the damper 28, and an engine misfire is identified in the resonance-region engine misfire detection processing different from the ordinary engine misfire detection processing when the operating condition of the engine 22 belongs to a resonance region of a rear portion including the damper 28. Therefore, regardless of whether or not the operating condition of the engine 22 belongs to a resonance region of a rear portion including the damper 28, it is possible to identify an engine misfire more reliably and with good accuracy.

Also, according to the engine misfire identification device for an internal combustion engine that is mounted on the hybrid vehicle 20 of the first embodiment, an engine misfire is identified when the operating condition of the engine 22 belongs to a resonance region of a rear portion including the damper 28, depending on whether or not the variation ΔF in the rotation speed after filtering F (N30) obtained by applying a high-pass filter to remove the effect of the resonance to the 30-degree rotation speed N30 is less than the threshold value Fref. Therefore, even when the operating condition of the engine 22 belongs to a resonance region, it is possible to identify an engine misfire more reliably and with good accuracy. Moreover, because the characteristics of the high-pass filter are set by the rotation speed Ne of the engine 22, it is possible to identify an engine misfire with better accuracy. Also, because the threshold value Fref for engine misfire identification is changed by the torque Te of the engine 22, it is possible to identify an engine misfire with better accuracy.

In the engine misfire identification device for an internal combustion engine that is mounted on the hybrid vehicle 20 of the first embodiment, when the operating condition of the engine 22 does not belong to a resonance region of a rear portion including the damper 28, an engine misfire is identified as the ordinary engine misfire detection processing by performing processing to identify an engine misfire depending on whether or not the required 30-degree rotation time T30 is larger than the threshold value Tref. However, an engine misfire identification is not limited to engine misfire detection based on the required 30-degree rotation time T30, and an engine misfire may also be identified by performing other engine misfire detection processing as the ordinary engine misfire detection processing.

In the engine misfire identification device for an internal combustion engine that is mounted on the hybrid vehicle 20 of the first embodiment, when the operating condition of the engine 22 belongs to a resonance region of a rear portion including the damper 28, an engine misfire is identified as the resonance-region engine misfire detection processing by performing processing to identify an engine misfire depending on whether or not the variation ΔF in the rotation speed after filtering F (N30) obtained by applying a high-pass filter to the 30-degree rotation speed N30 is less than the threshold value Fref. However, an engine misfire identification is not limited to engine misfire detection based on the variation ΔF in the rotation speed after filtering F (N30), and an engine misfire may also be identified by performing other engine misfire detection processing, for example, processing that involves identifying an engine misfire by a variation in the rotation of the engine 22 from which the effect of the resonance is removed, as the resonance-region engine misfire detection processing.

In the engine misfire identification device for an internal combustion engine that is mounted on the hybrid vehicle 20 of the first embodiment, as the resonance-region engine misfire detection processing, an engine misfire is identified by the variation ΔF in the rotation speed after filtering F (N30), which is obtained by applying a high-pass filter suitable for the rotation speed Ne of the engine 22 to the 30-degree rotation speed N30. However, an engine misfire may also be identified by the variation ΔF in the rotation speed after filtering F (N30), which is obtained by applying the same high-pass filter to the 30-degree rotation speed N30 regardless of the rotation speed Ne of the engine 22. In this case, as the characteristics of a high-pass filter, it is necessary only that the high-pass filter allow a frequency three times a minimum rotation speed of the range of the rotation speed Ne of the engine 22, which becomes a resonance region, to pass through, but cut a frequency half a maximum rotation speed of the range of the rotation speed Ne of the engine 22, which becomes a resonance region.

In the engine misfire identification device for an internal combustion engine that is mounted on the hybrid vehicle 20 of the first embodiment, as the resonance-region engine misfire detection processing, it is identified that an engine misfire has occurred when the variation ΔF in the rotation speed after filtering F (N30) is below the threshold value Fref suitable for the torque Te of the engine 22. However, it may also be identified that an engine misfire has occurred when the variation ΔF in the rotation speed after filtering F (N30) is below a given threshold value regardless of the torque Te of the engine 22.

In the engine misfire identification device for an internal combustion engine that is mounted on the hybrid vehicle 20 of the first embodiment, when it has been identified on the basis of the rotation speed Ne and the torque Te of the engine 22 that the operating condition of the engine 22 belongs to a resonance region of a rear portion including the damper 28 (the power distribution and integration mechanism 30 and the like), the period in which the crankshaft 26 rotates through 720 degrees, i.e., the period corresponding to two rotations of the engine 22 is regarded as a period of an engine misfire, a rotation speed after filtering F (N30) is obtained by applying a high-pass filter, for which a cut-off frequency is set so that a frequency corresponding to this period is sufficiently cut, to the 30-degree rotation speed N30, and engine misfire detection is performed to find out whether or not any one of cylinders of the engine 22 undergoes an engine misfire. However, when it has been identified that the operating condition of the engine 22 is in a resonance region of a rear portion including the damper 28 on the basis of the rotation speed Ne and the torque Te of the engine 22, it is also possible to perform engine misfire detection to find out whether or not any one of cylinders of the engine 22 undergoes an engine misfire by making an identification as to whether the period of the resonance of a rear portion including the damper 28 is in an area corresponding to one rotation of the engine 22 (a one-rotation area) or in an area corresponding to two rotations (a two-rotation area) on the basis of the rotation speed Ne and the torque Te of the engine 22, and obtaining the rotation speed after filtering F (N30) by applying a high-pass filter suitable for the resonance period to the 30-degree rotation speed N30, which is the result of this identification. In this case, the resonance-region engine misfire detection processing of FIG. 10 can be executed in place of the resonance-region engine misfire detection processing of FIG. 5. A description will be given below of a hybrid vehicle 20B in a modification for executing the resonance-region engine misfire detection processing of FIG. 10.

Figure 10:
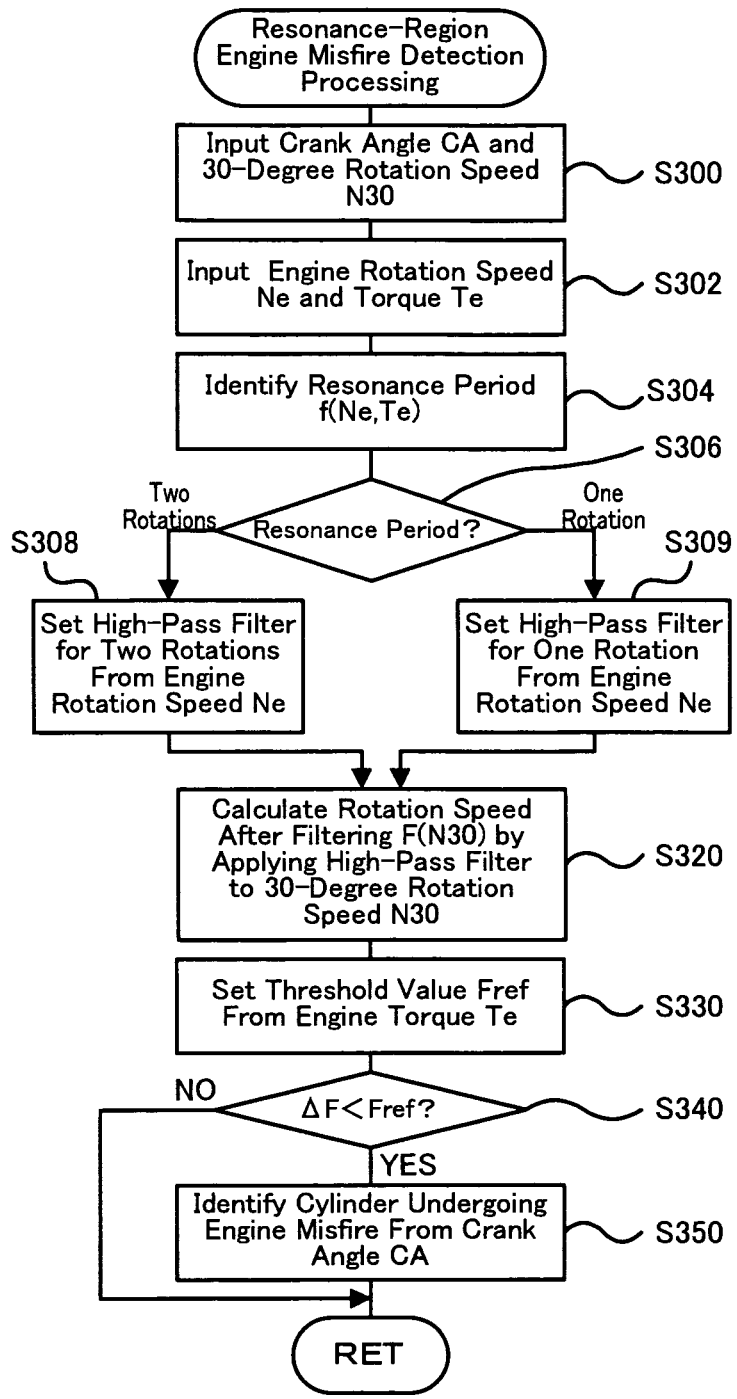
FIG. 10 is a flowchart showing an example of resonance-region engine misfire detection processing in a modification.
Figure 11:
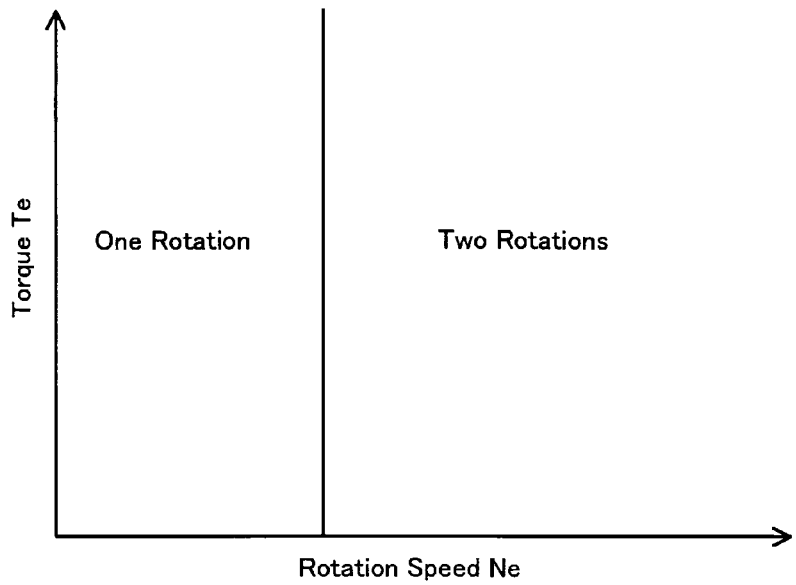
FIG. 11 is an explanatory diagram showing an example of a map of the region of resonance period.

In the resonance-region engine misfire detection processing of FIG. 10, the crank angle CA and the 30-degree rotation speed N30 are input (Step S300), the rotation speed Ne and the torque Te of the engine 22 are input (Step S302), and on the basis of the rotation speed Ne and torque Te of the engine 22, which are input, an identification is made as to whether the period of the resonance of a rear portion including the damper 28 is in a region corresponding to one rotation of the engine 22 (a one-rotation area) or in a region corresponding to two rotations (a two-rotation area) (Step S304). In this connection, the torque Te of the engine 22 is input by calculating a torque that is supposed to be output on the basis of the rotation speed Ne of the engine 22 and the opening of the throttle valve 124 (accelerator opening). To identify the period of the resonance, there is adopted a method which is such that in an embodiment, with respect to the rotation speed Ne and the torque Te of the engine 22, whether the period of the resonance of a rear portion including the damper 28 is in a one-rotation area or a two-rotation area is determined beforehand in an experiment and stored as a map in the ROM 24b of the engine ECU 24 and when the rotation speed Ne and the torque Te of the engine 22 are given, a region of a corresponding resonance period is derived froth the map. FIG. 11 shows an example of a map of the region of resonance period.

The resonance period is identified (S304, S306). A high-pass filter for two-rotations is set on the basis of the rotation speed Ne of the engine 22 (Step S308) when it is identified as the result of the identification that the resonance period is an area corresponding to two rotations of the engine 22 (a two-rotation area), a high-pass filter for one rotation is set on the basis of the rotation speed Ne of the engine 22 (Step S309) when it is identified that the resonance period is an area corresponding to one rotation of the engine 22 (a one-rotation area), a rotation speed after filtering F (N30) is obtained by applying a high-pass filter set at the 30-degree rotation speed N30 (Step 320), and on the basis of this rotation speed after filtering F (N30) the above-described steps S330 to S350 are executed, whereby engine misfire detection is performed to find out whether or not any one of cylinders of the engine 22 undergoes an engine misfire. In this connection, the processing for setting a high-pass filter for two-rotations on the basis of the rotation speed Ne of the engine 22 at Step S312 is the same as the processing of Step S310 in the resonance-region engine misfire detection processing of FIG. 5 in the above-described first embodiment, because the time for which the crank angle CA rotates through 720 degrees is the resonance period. In the hybrid vehicle 20B of this modification, there is adopted a method which is such that a high-pass filter for two rotations and a high-pass filter for one rotation are set by changing the number of basic high-pass filters in which the attenuation of the frequency of explosive combustion of the engine 22 is small, but the attenuation of the frequency of resonance is large. The frequency of an engine misfire is obtained by dividing the frequency of explosive combustion by the number of cylinders. Therefore, the resonance of two rotations becomes this frequency of an engine misfire and the resonance of one rotation becomes a frequency twice the frequency of an engine misfire. In the case of a 6-cylinder engine, at 2000 rpm the frequency of explosive combustion of the cylinders is 100 Hz, the frequency of resonance of two rotations is 17 Hz, and the frequency of resonance of one rotation is 33 Hz. Therefore, when a high-pass filter in which the attenuation rate for the frequency of explosive combustion (100 Hz) is 99%, the attenuation rate for the frequency of two rotations (17 Hz) is 50% and the attenuation rate for the frequency of one rotation (33 Hz) is 70% is used as a basic high-pass filter and the design value of a component of influence of resonance in the rotation speed after filtering F (N30) is an attenuation rate of 25%, then it is possible to use two superposed basic high-pass filters as a high-pass filter for two rotations and four superposed basic high-pass filters as a high-pass filter for one rotation. On the basis of this conception, in the hybrid vehicle 20B of the modification, a high-pass filter for two rotations and a high-pass filter for one rotation are set by changing the number of superposed basic high-pass filters. Incidentally, a high-pass filter for two rotations and a high-pass filter for one rotation are not limited to those obtained by changing the number of superposed basic high-pass filters, and a high-pass filter for two rotations and a high-pass filter for one rotation may also be separately prepared and used.

According to the engine misfire identification device for an internal combustion engine that is mounted on the hybrid vehicle 20B in this modification, when the operating condition of the engine 22 belongs to a resonance region of a rear portion including the damper 28, an identification is made as to whether the period of resonance is in an area corresponding to one rotation of the engine 22 (a one-rotation area) or in an area corresponding to two rotations (a two-rotation area) and an engine misfire is identified by using the rotation speed after filtering F (N30), which is obtained by applying a high-pass filter suitable for the period of resonance to the 30-degree rotation speed N30. Therefore, it is possible to identify an engine misfire of the engine 22 with better accuracy according to the period of resonance of a rear portion including the damper 28.

In the engine misfire identification device for an internal combustion engine that is mounted on the hybrid vehicle 20B in the modification, an identification on the resonance period is made as to whether the period of the resonance of a rear portion including the damper 28 is in an area corresponding to one rotation of the engine 22 or in an area corresponding to two rotations on the basis of the rotation speed Ne and the torque Te of the engine 22. However, an identification may also be made as to whether the period of the resonance of a rear portion including the damper 28 is in an area corresponding to one rotation of the engine 22 or in an area corresponding to two rotations on the basis of only one of the rotation speed Ne and the torque Te of the engine 22. Also, an identification may be made as to whether the period of the resonance of a rear portion including the damper 28 is in an area corresponding to one rotation of the engine 22 or in an area corresponding to two rotations by adding other requirements, for example, the connecting condition of a rear portion behind the damper 28, to the rotation speed Ne and the torque Te of the engine 22.

In the engine misfire identification device for an internal combustion engine that is mounted on the hybrid vehicle 20 in the first embodiment, on the basis of the rotation speed Ne and the torque Te of the engine 22, an identification is made as to whether or not the operating condition of the engine 22 belongs to a resonance region of a rear portion including the damper 28 (the power distribution and integration mechanism 30 and the like) and, when it has been identified that the operating condition of the engine 22 belongs to a resonance region, the period in which the crankshaft 26 rotates through 720 degrees is regarded as a period of an engine misfire, a rotation speed after filtering F (N30) is obtained by applying a high-pass filter, for which a cut-off frequency is set so that a frequency corresponding to this period is sufficiently cut, to the 30-degree rotation speed N30, and engine misfire detection is performed to find out whether or not any one of cylinders of the engine 22 undergoes an engine misfire. However, it is also possible to adopt a method which is such that an identification is made as to whether or not the operating condition of the engine 22 belongs to a resonance region of a rear portion including the damper 28 on the basis of only the rotation speed Ne of the engine 22 and engine misfire detection is performed to find out whether or not any one of cylinders of the engine 22 undergoes an engine misfire by obtaining a rotation speed after filtering F (N30) by applying a high-pass filter suitable for the rotation speed Ne of the engine 22 to the 30-degree rotation speed N30. In this case, for the identification as to whether the operating condition of the engine 22 belongs to a resonance region at Step S110 in the engine misfire identification processing of FIG. 3, it is identified that the operating condition of the engine 22 belongs to a resonance region when the rotation speed Ne of the engine 22 is not more than a prescribed rotation speed (for example, 4000 rpm and 5000 rpm). And for the engine misfire detection processing in a resonance region, the resonance-region engine misfire detection processing of FIG. 12 can be executed in place of the resonance-region engine misfire detection processing of FIG. 5. A description will be given below of a hybrid vehicle 20C in a modification for executing the resonance-region engine misfire detection processing of FIG. 12.

Figure 12:
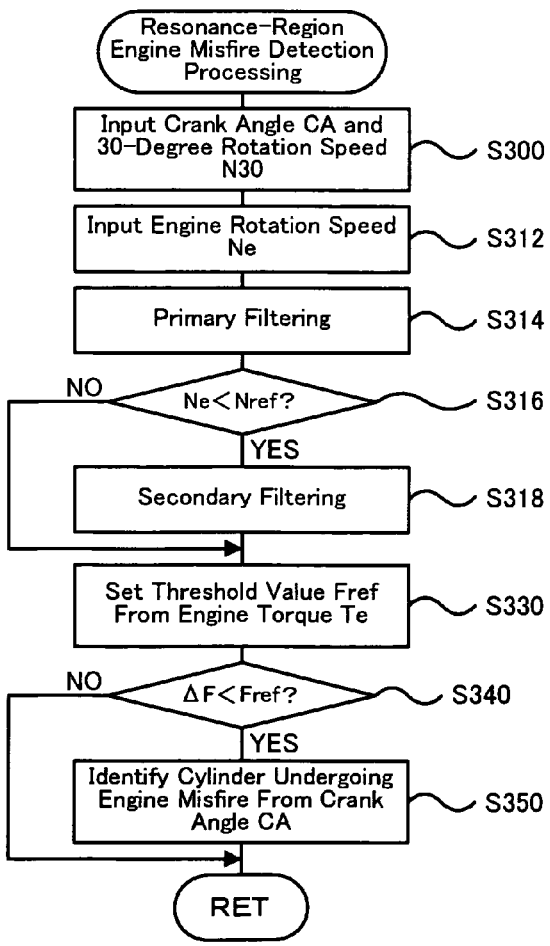
FIG. 12 is a flowchart showing an example of resonance-region engine misfire detection processing in a modification.

In the resonance-region engine misfire detection processing of FIG. 12, the crank angle CA and the 30-degree rotation speed N30 are input (Step S300), the rotation speed Ne of the engine 22 is input (Step S312), a rotation speed after filtering F (N30) is computed by executing primary filtering, which involves applying, to the 30-degree rotation speed N30, a filter that is obtained by superposing a first number of basic high-pass filters (for example, one, two and three basic high-pass filters) in which the attenuation of the frequency of explosive combustion is small when the engine 22 is rotating at a basic rotation speed (for example, 2000 rpm), but the attenuation of the frequency of a misfire is relatively large (Step S314), and the input rotation speed Ne of the engine 22 is compared with a threshold value Nref (Step S316). In this connection, the threshold value Nref is a threshold value for identifying whether or not it is within a rotation speed region where the effect of resonance is insufficiently removed by the primary filtering, which is necessary for identifying an engine misfire, and the threshold value Nref can be fixed from the performance of the filter used in the primary filtering and resonance. For example, 2000 rpm and 2500 rpm can be used.

When the rotation speed Ne of the engine 22 is not less than the threshold value Nref, it is identified that in the region the effect of resonance can be sufficiently removed by the primary filtering, and engine misfire detection is performed to find out whether or not any one of cylinders of the engine 22 undergoes an engine misfire by executing the above-described steps S330 to S350 on the basis of the rotation speed after filtering F (N30) obtained by the primary filtering. When the rotation speed Ne of the engine 22 is less than the threshold value Nref, it is identified that in the region the effect of resonance cannot be sufficiently removed by the primary filtering, and a rotation speed after filtering F (N30) is computed by executing secondary filtering, which involves applying, to the rotation speed after filtering F (N30) obtained by the primary filtering, a filter that is obtained by superposing a second number of basic high-pass filters (for example, one, two and three basic high-pass filters) used in the primary filtering (Step S318), and engine misfire detection is performed to find out whether or not any one of cylinders of the engine 22 undergoes an engine misfire by executing the above-described steps S330 to S350 on the basis of the rotation speed after filtering F (N30) obtained by the secondary filtering. If as filtering a computation for applying basic high-pass filters is to be repeated for the number of basic high-pass filters, then the primary filtering is processing that involves repeating the processing of applying basic high-pass filters for the first number of basic high-pass filters and the secondary filtering is processing that involves repeating the processing of applying basic high-pass filters for the second number of basic high-pass filters. Therefore, when the rotation speed Ne of the engine 22 is not less than the threshold value Nref, the rotation speed after filtering F (N30) is obtained by repeating the processing of applying basic high-pass filters for the first number of basic high-pass filters. When the rotation speed Ne of the engine 22 is less than the threshold value Nref, the rotation speed after filtering F (N30) is obtained by repeating the processing of applying basic high-pass filters for a sum of the first number and second number of basic high-pass filters. As a result of this, the load of the computation processing necessary for filtering when the rotation speed Ne of the engine 22 is not less than the threshold value Nref is reduced compared to that of the computation processing necessary for filtering when the rotation speed Ne of the engine 22 is less than the threshold value Nref.

According to the engine misfire identification device for an internal combustion engine that is mounted on the hybrid vehicle 20C in this modification, depending on whether or not the rotation speed Ne of the engine 22 is a prescribed rotation speed (for example, 4000 rpm and 5000 rpm) or less, an identification is made as to whether or not the operating condition of the engine 22 belongs to a resonance region of a rear portion including the damper 28. When the operating condition of the engine 22 belongs to a resonance region of a rear portion including the damper 28, first, the primary filtering is executed, and depending on whether or not the rotation speed Ne of the engine 22 is not less than the threshold value Nref, an identification is made as to whether or not it is within the region where the effect of resonance cannot be sufficiently removed by the primary filtering. The secondary filtering is then executed and the rotation speed after filtering F (N30) is computed, and an engine misfire is identified by using this rotation speed after filtering F (N30). Therefore, it is possible to identify an engine misfire of the engine 22 with better accuracy according to the rotation speed Ne of the engine 22. In addition, as the primary filtering, processing that involves repeating the processing of applying basic high-pass filters for the first number of basic high-pass filters is executed, and as the secondary filtering, processing that involves repeating the processing of applying basic high-pass filters for a sum of the first number and second number of basic high-pass filters is executed. Therefore, the computation necessary for filtering when the rotation speed Ne of the engine 22 is not less than the threshold value Nref is reduced compared to that of the computation processing necessary for filtering when the rotation speed Ne of the engine 22 is less than the threshold value Nref. Furthermore, it is necessary only that filtering be repeated by using basic high-pass filters as the primary filtering and the secondary filtering, although the number of times is different. Therefore, it is unnecessary to prepare high-pass filters having a plurality of parameters.

In the engine misfire identification device for an internal combustion engine that is mounted on the hybrid vehicle 20C in this modification, an engine misfire is identified by comparing the rotation speed Ne of the engine 22 with one threshold value Nref, and computing the rotation speed after filtering F (N30) by performing primary filtering by use of a filter comprising a first number of superposed basic high-pass filters, and an engine misfire is identified by computing the rotation speed after filtering F (N30) by performing secondary filtering by use of a filter comprising a second number of superposed basic high-pass filters in addition to the primary filtering. However, it is also possible to adopt a method which is such that the rotation speed Ne of the engine 22 is compared with two or more threshold values and three or more kinds of filtering are selectively performed, whereby an engine misfire is identified by computing the rotation speed after filtering F (N30). For example, the rotation speed Ne of the engine 22 is compared with two threshold values Nref1 and Nref2 (Nref1<Nref2). When the rotation speed Ne of the engine 22 is not less than the threshold value Nref2, primary filtering is performed by use of a filter comprising a first number of superposed basic high-pass filters and an engine misfire is identified by computing the rotation speed after filtering F (N30). When the rotation speed Ne of the engine 22 is not less than the threshold value Nref1 and less than the threshold value Nref2, secondary filtering is performed by use of a filter comprising a second number of superposed basic high-pass filters in addition to the primary filtering and an engine misfire is identified by computing the rotation speed after filtering F (N30). When the rotation speed Ne of the engine 22 is less than the threshold value Nref1, tertiary filtering is performed by use of a filter comprising a third number of superposed basic high-pass filters in addition to the primary filtering and the secondary filtering, and an engine misfire is identified by computing the rotation speed after filtering F (N30).

Next, a description will be given of a hybrid vehicle 20D on which an engine misfire identification device for an internal combustion engine as the second embodiment of the present invention is mounted. The hybrid vehicle 20D of the second embodiment has the same hardware configuration as the hybrid vehicle 20 of the first embodiment described with reference to FIGS. 1 and 2, with the exception that the engine 22 has eight cylinders as the hardware configuration. In order to omit duplicate descriptions, for the hardware configuration of the hybrid vehicles 20D of the second embodiment, the same symbols as used in the hardware configuration of the hybrid vehicle 20 of the first embodiment are used, and the descriptions are omitted.

Figure 13:
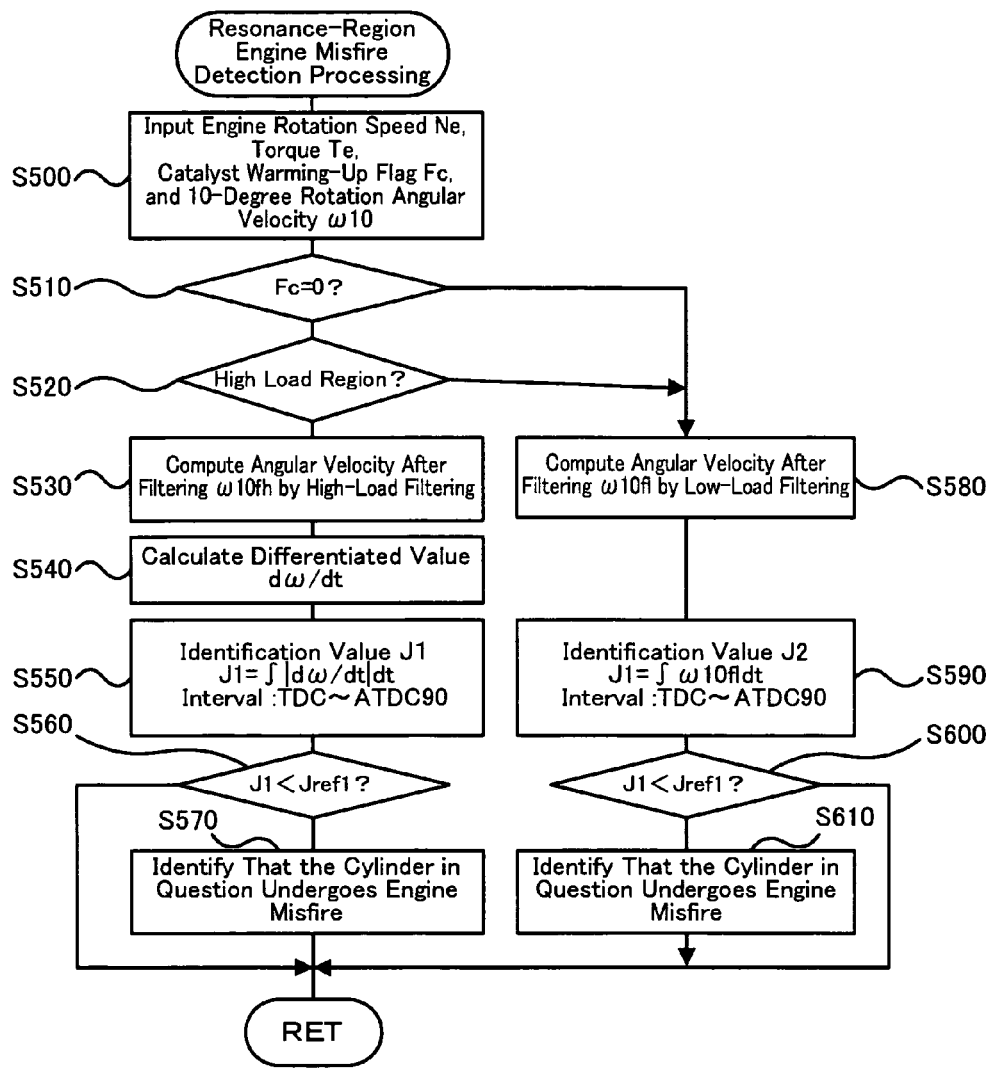
FIG. 13 is a flowchart showing an example of resonance-region engine misfire detection processing in the second embodiment.

In the same manner as the engine misfire identification device for an internal combustion engine mounted on the hybrid vehicle 20 of the first embodiment, an engine misfire identification device for an internal combustion engine mounted on the hybrid vehicle 20D of the second embodiment executes the engine misfire identification processing of FIG. 3 and the ordinary engine misfire detection processing of FIG. 4, with the exception that the engine misfire identification device for an internal combustion engine mounted on the hybrid vehicle 20D of the second embodiment executes the resonance-region engine misfire detection processing schematically represented in FIG. 13 in place of the resonance-region engine misfire detection processing schematically represented in FIG. 5. The resonance-region engine misfire detection processing schematically represented in FIG. 5, the engine misfire identification processing of FIG. 3 and the ordinary engine misfire detection processing of FIG. 4 were described above.

Figure 14:
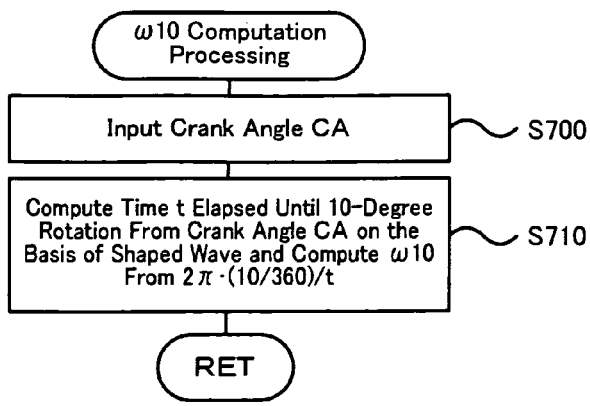
FIG. 14 is a flowchart showing an example of computation processing of ω10.

In the engine misfire identification device for an internal combustion engine mounted on the hybrid vehicle 20D of the second embodiment, when the resonance-region engine misfire detection processing of FIG. 13 has been executed by an engine ECU 24, a CPU 24a of the engine ECU 24 first executes processing of inputting the rotation speed Ne and torque Te of an engine 22, a catalyst warming-up flag Fc, the 10-degree rotation angular velocity ω10, which is a rotation angular velocity occurring each time a crankshaft 26 rotates through 10 degrees and computed by the ω10 computation processing schematically represented in FIG. 14 (Step S500). In this connection, the catalyst warming-up flag Fc is a flag that indicates whether or not the engine 22 is operating in a prescribed operating condition in order to warm up a catalyst filled in a purifier 134 of the engine 22. The value 1 is set by a hybrid electronic control unit 70 when the engine 22 is operating in a prescribed operating condition in order to warm up the catalyst, and the value 0 is set when the engine 22 is not operating in a prescribed operating condition in order to warm up the catalyst. Examples of a prescribed operating condition of the engine 22 to warm up the catalyst include, for example, ensuring that the heat by explosive combustion of the engine 22 can be easily supplied to the purifier 134 by delaying the angle of the crankshaft in the ignition period compared to ordinary time. As shown in the ω10 computation, the 10-degree rotation angular velocity ω10 can be found by inputting the crank angle CA (Step S700), computing the time t that elapses until a 10-degree rotation from a shaped wave from a crank position sensor 140 on the basis of the input crank angle CA, and computing the 10-degree rotation angular velocity ω10 in the crank angle CA on the basis of 2π(10/360)/t (Step S710).

When the data is input in this manner, the value of the input catalyst warming-up flag Fc is examined and an identification is made as to whether or not the operating condition of the engine 22 is in a high-load region from the rotation speed Ne and the torque Te of the engine 22 (Steps S510 and S520). As to whether or not the operating condition of the engine 22 is in a high-load region, a high-load region is set beforehand by setting a rotation speed Ne and the torque Te of the engine 22 at which the load becomes high, and stored in a ROM 24b, and an identification is made depending on whether the rotation speed Ne and the torque Te of the engine 22 belong to the stored high-load region.

When the value of the catalyst warming-up flag Fc is 0, that is, when the engine 22 is not operating in a prescribed operating condition in order to warm up the catalyst and, at the same time, the engine 22 is operating in a high-load region, the angular velocity after filtering ω10fh is computed by subjecting the 10-degree rotation angular velocity ω10 to high-load filtering (Step S530). As high-load filtering, for example, it is possible to adopt processing that involves applying, to the 10-degree rotation angular velocity ω10, a high-pass filter obtained by superposing a first number of basic high-pass filters (for example, three and four basic high-pass filters) in which the attenuation of the frequency of explosive combustion of the engine 22 is small, but the attenuation of the resonance frequency of a rear portion including the damper 28 is relatively large. In this case, it is necessary only that the computation of applying the basic high-pass filters to the 10-degree rotation angular velocity ω10 be repeated for the number of times corresponding to a first number of basic high-pass filters.

When the angular velocity after filtering ω10fh has been computed in this manner, a differentiated value dω/dt of the angular velocity after filtering ω10fh is calculated (Step S540). In the embodiment, in consideration of the calculation of the 10-degree rotation angular velocity ω10, which is a rotation angular velocity of the crankshaft 26 occurring at every 10 degrees, the value obtained by Equation (2) below is regarded as a differentiated value dω/dt. In Equation (2), calculations are made by regarding a differentiated value dω/dt as a value obtained by dividing a difference between the 10-degree rotation angular velocity ω10 (CA), which is a rotation angular velocity occurring at the crank angle CA, and the 10-degree rotation angular velocity ω10 (CA−10), which is a rotation angular velocity occurring at the crank angle (CA−10), {ω10hi (CA)−ω10hi (CA−10)} by the time required by the crankshaft 26 in rotating through 10 degrees at the 10-degree rotation angular velocity ω10hi (CA), which is a rotation angular velocity at the crank angle CA.

$$d\omega/dt = \frac{18}{\pi} \times \omega 10 fhi(CA)\{\omega 10 fhi(CA) - \omega 10 fhi(CA-10)\} \quad (2)$$

Figure 15:
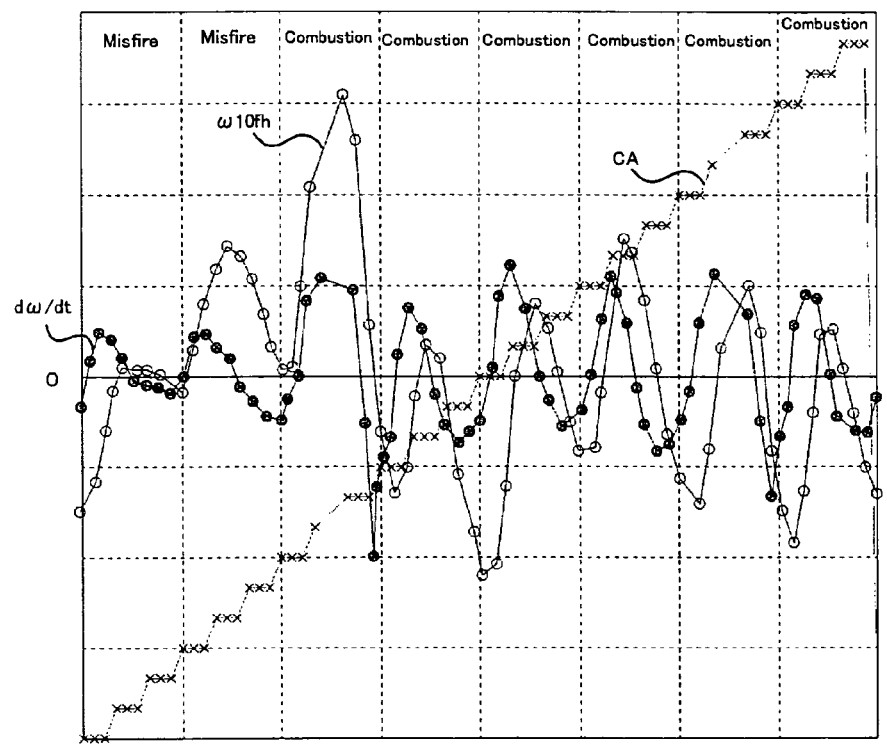
FIG. 15 is an explanatory diagram showing an example of changes in an angular velocity after filtering ω10/h and a differentiated value dω/dt when the first cylinder and the second cylinder in the ignition order are caused to undergo an engine misfire during the operation of the engine 22 in a high-load region.
Figure 16:
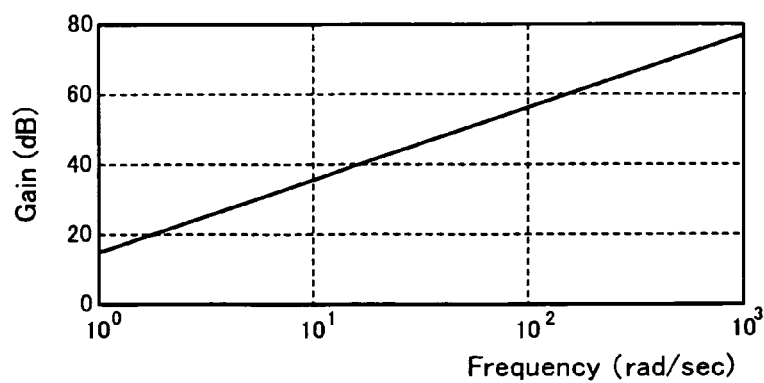
FIG. 16 is an explanatory diagram showing a relationship between frequency and gain by a differential operation.

Subsequently, an identification value J1 is found by integrating the absolute value of a differentiated value dω/dt, with a section between the position of 0 degrees (TDC) from a top dead center in the compression stroke and the position of 90 degrees (ATDC90) from the top dead center set as the integration interval (Step S550), and the found identification value J1 is compared with a threshold value Jref1 (Step S560). When the identification value J1 is less than the threshold value Jref1, it is identified that the cylinder in question undergoes an engine misfire (Step S570) and the resonance-region engine misfire detection processing is finished. FIG. 15 shows an example of changes in the angular velocity after filtering ω10fh and the differentiated value dω/dt obtained when the first cylinder and the second cylinder in the ignition order are caused to undergo an engine misfire during the operation of the engine 22 in a high-load region. As shown in the drawing, in the angular velocity after filtering ω10fh, the behavior of an engine misfire and the behavior observed immediately after engine misfire are irregular because the effect of the resonance of a rear portion including the damper 28 is not be completely removed. In the differentiated value dω/dt, however, the irregularity is small compared to the angular velocity after filtering ω10fh. And the change in the differentiated value dω/dt is small in the cylinder undergoing an engine misfire. In the second embodiment, an engine misfire is identified on the basis of the fact that the change in the differentiated value dω/dt is small in the cylinder undergoing an engine misfire. The reason why the irregularity of the differentiated value dω/dt is small compared to the angular velocity after filtering ω10fh, is that the frequency component of resonance including the damper 28 is greatly smoothed by differential computation compared to the frequency component of explosive combustion. The relationship between frequency and gain by differential computation is shown in FIG. 16. Incidentally, because the differentiated value dω/dt obtained by differential computation is integrally computed, it might be thought that the degree of smoothing returns to the initial state. However, the effect of the degree of smoothing by differential computation manifest itself greatly because the integral interval is short. The reason why a section between the position of 0 degrees (TDC) from a top dead center in the compression stroke and the position of 90 degrees (ATDC90) from the top dead center is set as the integration interval is as follows. That is, in an 8-cylinder engine, explosive combustion occurs each time the crankshaft 26 rotates through 90 degrees and, therefore, acceleration occurs due to the explosive combustion in the section between 10 degrees (ATDC10) from a top dead center in the compression stroke and 50 degrees (ATDC50) from the top dead center and deceleration occurs in the subsequent portion due to the compression of the cylinders, with the result that acceleration and deceleration manifest themselves greatly if explosive combustion occurs, whereas acceleration and deceleration manifest themselves slightly if an engine misfire occurs. Therefore, if explosive combustion occurs, the differentiated value dω/dt takes a relatively large positive value in the section between 10 degrees (ATDC10) from a top dead center in the compression stroke and 50 degrees (ATDC50) from the top dead center and takes a relatively large negative value in the subsequent portion. In contrast to this, in the case of an engine misfire, the differentiated value dω/dt takes a relatively small positive value in the section between 10 degrees (ATDC10) from a top dead center in the compression stroke and 50 degrees (ATDC50) from the top dead center and takes a relatively small negative value in the subsequent portion. Therefore, if the absolute value of the differentiated value dω/dt is integrated by setting the section between the position of TDC and the position of ATDC90 as the integral interval, dω/dt takes a large value in the case of explosive combustion and takes a small value in the case of an engine misfire. For this reason, if the threshold value Jref1 to be compared with the identification value J1 is set as a value that is sufficiently smaller than a value calculated as the identification value J1 in the case of explosive combustion and, at the same time, sufficiently larger than a value calculated as the identification value J1 in the case of an engine misfire, it is possible to identify whether or not the cylinder in question undergoes an engine misfire by making a comparison between the identification value J1 and the threshold value Jref1. Incidentally, when it is identified at Step S560 that the identification value J1 is not less than the threshold value Jref1, it is identified that the cylinder in question does not undergo an engine misfire and the resonance-region engine misfire detection processing is finished.

When at Step S510 it has been identified that the value of the catalyst warming-up flag Fc is 1, that is, the engine 22 is operating in a prescribed operating condition in order to warm up the catalyst or when at Step S520 it has been identified that the engine 22 is not operating in a high-load region, the angular velocity after filtering ω10fl is computed by subjecting the 10-degree rotation angular velocity ω10 to low-load filtering (Step S580). As low-load filtering it is possible to adopt processing that involves applying a high-pass filter obtained by superposing a second number of basic high-pass filters used in the high-load filtering (for example, one and two basic high-pass filters) to the 10-degree rotation angular velocity ω10. In this case, it is necessary only that the computation of applying the basic high-pass filters to the 10-degree rotation angular velocity ω10 be repeated for the number of times corresponding to a second number of basic high-pass filters. The reason why the number of superposed basic high-pass filters in low-load filtering is small compared to the corresponding number in high-load filtering is that the effect of the resonance of a rear portion including the damper 28 also manifests itself slightly because the engine 22 is operating under a low load.

Figure 17:
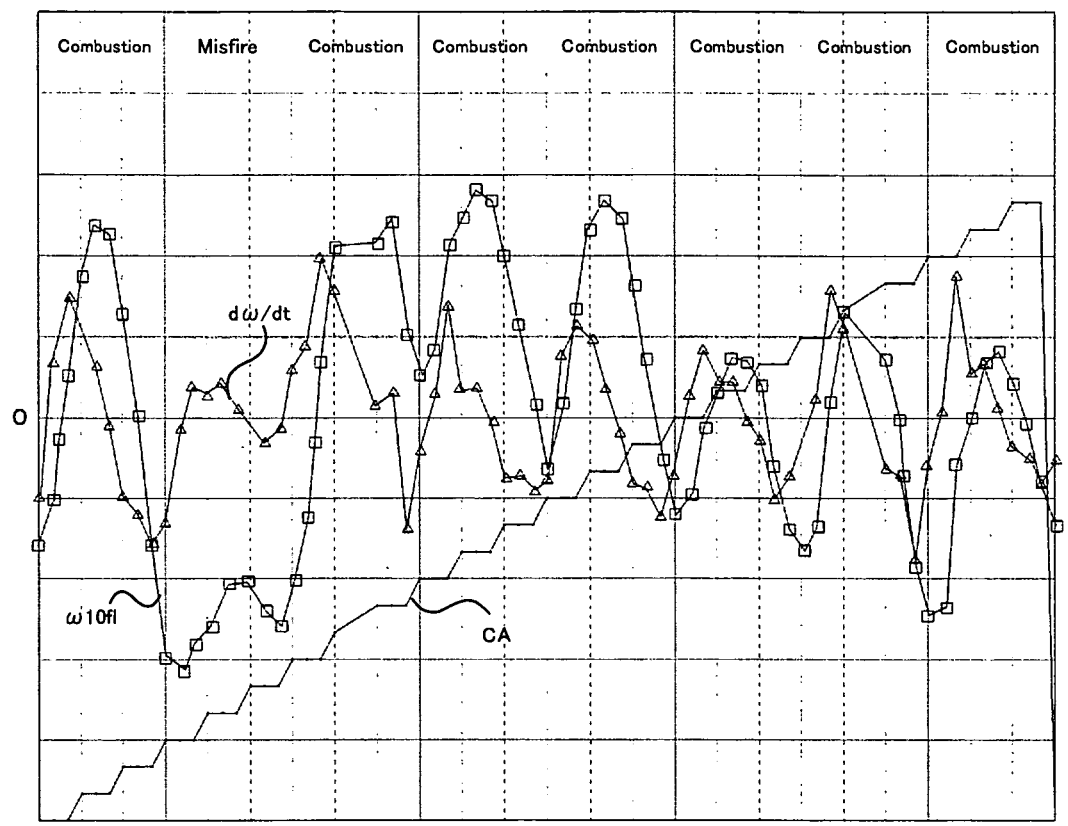
FIG. 17 is an explanatory diagram showing an example of changes in an angular velocity after filtering ω10/l and a differentiated value dω/dt of this angular velocity after filtering ω10/l when the second cylinder in the ignition order is caused to undergo an engine misfire during the operation of the engine 22 in a low-load region.

Subsequently, the angular velocity after filtering ω10fl is found by integration, with a section between the position of 0 degrees (TDC) from a top dead center in the compression stroke and the position of 90 degrees (ATDC90) from the top dead center set as the integration interval (Step S590), and a found identification value J2 is compared with a threshold value Jref2 (Step S600). When the identification value J2 is less than the threshold value Jref2, it is identified that the cylinder in question undergoes an engine misfire (Step S610) and the resonance-region engine misfire detection processing is finished. FIG. 17 shows an example of changes in the angular velocity after filtering ω10fl and the differentiated value dω/dt of this angular velocity after filtering ω10fl obtained when the second cylinder in the ignition order is caused to undergo an engine misfire during the operation of the engine 22 in a low-load region. As shown in the drawing, the variation in the angular velocity after filtering ω10fl manifest itself greatly compared to the variation in the differentiated value dω/dt in the second cylinder undergoing an engine misfire. At this time, the variation in the angular velocity after filtering ω10fl fluctuates greatly to the negative side and, therefore, the identification value J2 as an integrated value of the angular velocity after filtering ω10fl becomes close to 0 in the case of explosive combustion and takes a relatively large negative value in the case of an engine misfire. For this reason, if the threshold value Jref2 to be compared with the identification value J2 is set as a value that is sufficiently smaller than a value (close to 0) calculated as the identification value J2 in the case of explosive combustion and, at the same time, sufficiently larger than a value (a relatively large negative value) calculated as the identification value J2 in the case of an engine misfire, it is possible to identify whether or not the cylinder in question undergoes an engine misfire by making a comparison between the identification value J2 and the threshold value Jref2. Incidentally, when it is identified at Step S600 that the identification value J2 is not less than the threshold value Jref2, it is identified that the cylinder in question does not undergo an engine misfire and the resonance-region engine misfire detection processing is finished.

In this connection, it is identified that any one of cylinders of the engine 22 undergoes an engine misfire even when it is identified that the engine 22 is operating in a prescribed operating condition to warm up the catalyst in the same way as when the engine 22 is not operating in a high-load region. This is because, when the engine 22 is operating in a prescribed operating condition to warm up the catalyst, the resonance of a rear portion including the damper 28 due to explosive combustion manifests itself slightly compared to the case where the engine 22 is operating in a high-load region to bring the engine 22 into an operating condition, such as delaying the angle of the crankshaft in the ignition period as described above.

According to the above-described engine misfire identification device for an internal combustion engine that is mounted on the hybrid vehicle 20D of the second embodiment, in the case where the engine 22 is operating in a high-load region when the operating condition of the engine 22 belongs to a resonance region of a rear portion including the damper 28, the identification value J1 is found by integrating the absolute value of the differentiated value dω/dt of the angular velocity after filtering ω10fh, which is obtained by subjecting the 10-degree rotation angular velocity ω10, which is a rotation angular velocity of the crankshaft 26 occurring every 10 degrees, to high-load filtering, with a section between the position of TDC and the position of ATDC90 set as the integration interval, and an identification is made as to whether or not the cylinder in question undergoes an engine misfire by comparing this found identification value J1 with the threshold value Jref1. Therefore, it is possible to identify an engine misfire of the engine 22 with good accuracy in the case where the engine 22 is operating in a high-load region when the operating condition of the engine 22 belongs to a resonance region of a rear portion including the damper 28. Furthermore, in the case where the engine 22 is operating in a low-load region when the operating condition of the engine 22 belongs to a resonance region of a rear portion including the damper 28, and in the case where the engine 22 is operating in a prescribed operating condition in order to warm up the catalyst, the identification value J2 is found by integrating the angular velocity after filtering $\omega 10\!f\!1$, which is obtained by subjecting the 10-degree angular velocity $\omega 10$, which is a rotation angular velocity of the crankshaft 26 occurring every 10 degrees, to low-load filtering, with a section between the position of TDC and the position of ATDC90 set as the integration interval, and an identification is made as to whether or not the cylinder in question undergoes an engine misfire by comparing this found identification value J2 with the threshold value Jref2. Therefore, it is possible to identify an engine misfire of the engine 22 with good accuracy in the case where the engine 22 is operating in a low-load region when the operating condition of the engine 22 belongs to a resonance region of a rear portion including the damper 28 and in the case where the engine 22 is operating in a prescribed operating condition in order to warm up the catalyst.

In the engine misfire identification device for an internal combustion engine that is mounted on the hybrid vehicle 20D of the second embodiment, in the case where the engine 22 is operating in a high-load region when the operating condition of the engine 22 belongs to a resonance region of a rear portion including the damper 28, the angular velocity after filtering $\omega 10\!f\!h$ is computed by subjecting the 10-degree rotation angular velocity $\omega 10$ to filtering by use of a filter obtained by superposing a first number of basic high-pass filters. However, the angular velocity after filtering $\omega 10\!f\!h$ may also be computed by subjecting the 10-degree rotation angular velocity $\omega 10$ to filtering by use of a single high-pass filter for high loads.

In the engine misfire identification device for an internal combustion engine that is mounted on the hybrid vehicle 20D of the second embodiment, in the case where the engine 22 is operating in a high-load region when the operating condition of the engine 22 belongs to a resonance region of a rear portion including the damper 28, an engine misfire is identified by finding the identification value J1, which is obtained by integrating the absolute value of the differentiated value $d\omega/dt$ of the angular velocity after filtering $\omega 10\!f\!h$, which is obtained by subjecting the 10-degree rotation angular velocity $\omega 10$ to high-load filtering, with a section between the position of TDC and the position of ATDC90 set as the integration interval. However, an engine misfire may also be identified by finding the identification value J1, which is obtained by integrating the absolute value of the differentiated value $d\omega/dt$ of the angular velocity after filtering $\omega 10\!f\!h$, with a section between a position different from TDC and a position different from ATDC90 set as the integration interval. For example, an engine misfire may be identified by finding the identification value J1, which is obtained by integrating the absolute value of the differentiated value $d\omega/dt$ of the angular velocity after filtering $\omega 10\!f\!h$, by setting a section between the position of ATDC10 and the position of ATDC80 as the integration interval.

In the engine misfire identification device for an internal combustion engine that is mounted on the hybrid vehicle 20D of the second embodiment, in the case where the engine 22 is operating in a low-load region when the operating condition of the engine 22 belongs to a resonance region of a rear portion including the damper 28 and in the case where the engine 22 is operating in a prescribed operating condition in order to warm up the catalyst, an engine misfire is identified by finding the identification value J2, which is obtained by integrating the angular velocity after filtering $\omega 10\!f\!h$, which is obtained by subjecting the 10-degree rotation angular velocity $\omega 10$ to low-load filtering, with a section between the position of TDC and the position of ATDC90 set as the integration interval. However, in the case where the engine 22 is operating in a prescribed operating condition in order to warm up the catalyst, an engine misfire may be identified by a technique different from that used when the engine 22 is operating in a low-load region.

In the engine misfire identification device for an internal combustion engine that is mounted on the hybrid vehicle 20D of the second embodiment, in the case where the engine 22 is operating in a low-load region when the operating condition of the engine 22 belongs to a resonance region of a rear portion including the damper 28 and in the case where the engine 22 is operating in a prescribed operating condition in order to warm up the catalyst, the angular velocity after filtering $\omega 10\!f\!l$ is computed by subjecting the 10-degree rotation angular velocity $\omega 10$ to filtering by use of a filter obtained by superposing a second number of basic high-pass filters. However, the angular velocity after filtering $\omega 10\!f\!l$ may be computed by subjecting the 10-degree rotation angular velocity $\omega 10$ to filtering by use of a single high-pass filter for low loads.

In the engine misfire identification device for an internal combustion engine that is mounted on the hybrid vehicle 20D of the second embodiment, in the case where the engine 22 is operating in a low-load region when the operating condition of the engine 22 belongs to a resonance region of a rear portion including the damper 28 and in the case where the engine 22 is operating in a prescribed operating condition in order to warm up the catalyst, an engine misfire is identified by finding the identification value J2, which is obtained by integrating the angular velocity after filtering $\omega 10\!f\!l$, which is obtained by subjecting the 10-degree rotation angular velocity $\omega 10$ to low-load filtering, with a section between the position of TDC and the position of ATDC90 set as the integration interval. However, an engine misfire may also be identified by finding the identification value J2, which is obtained by integrating the angular velocity after filtering $\omega 10\!f\!l$, with a section between a position different from TDC and a position different from ATDC90 set as the integration interval. For example, an engine misfire may be identified by finding the identification value J2, which is obtained by integrating the angular velocity after filtering $\omega 10\!f\!l$, with a section between the position of ATDC10 and the position of ATDC80 set as the integration interval.

In the engine misfire identification device for an internal combustion engine that is mounted on the hybrid vehicle 20D of the second embodiment, the 10-degree rotation angular velocity $\omega 10$ is computed from a shaped wave from the crank position sensor 140 and the crank angle CA and the angular velocities after filtering $\omega 10\!f\!h$ and $\omega 10\!f\!l$ are computed by subjecting the 10-degree rotation angular velocity $\omega 10$ to filtering, whereby an engine misfire is identified. However, it is also possible to adopt a method which is such that in place of the 10-degree rotation angular velocity $\omega 10$ and the angular velocities after filtering $\omega 10\!f\!h$ and $\omega 10\!f\!l$, an NN-degree rotation angular velocity $\omega NN$, which is a rotation angular velocity occurring each time the crankshaft 26 rotates through another angle, such as 1 degree, 5 degrees and 20 degrees, is computed and angular velocities after filtering $\omega NN\!f\!h$ and $\omega NN\!f\!l$ are computed by subjecting $\omega NN$ to filtering, whereby an engine misfire is identified.

Next, a description will be given of a hybrid vehicle 20E on which an engine misfire identification device for an internal combustion engine as the third embodiment of the present invention is mounted. The hybrid vehicle 20E of the third embodiment has the same hardware configuration as the hybrid vehicle 20 of the first embodiment described with reference to FIGS. 1 and 2, with the exception that the engine 22 has eight cylinders as the hardware configuration. In order to omit duplicate descriptions, for the hardware configuration of the hybrid vehicle 20E of the third embodiment, the same symbols as used in the hardware configuration of the hybrid vehicle 20 of the first embodiment are used, and the descriptions are omitted.

Figure 18:
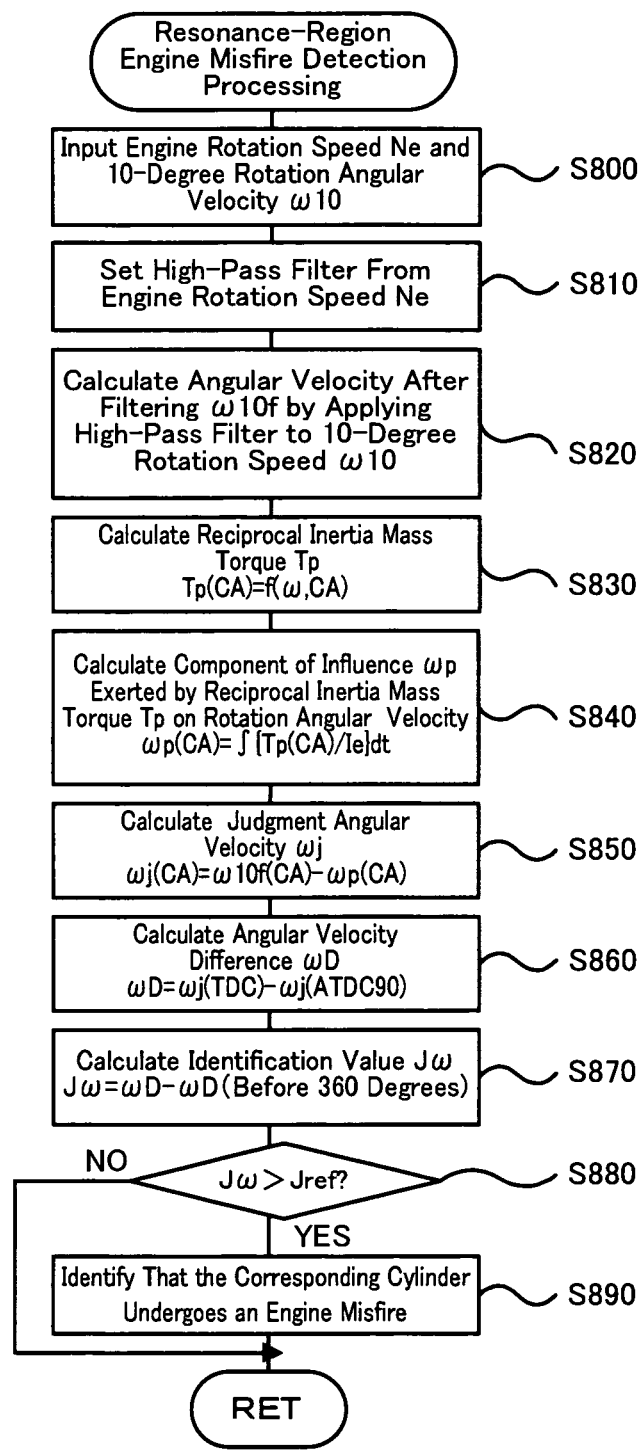
FIG. 18 is a flowchart showing an example of resonance-region engine misfire detection processing in the third embodiment.

In the same manner as the engine misfire identification device for an internal combustion engine mounted on the hybrid vehicle 20 of the first embodiment, an engine misfire identification device for an internal combustion engine mounted on the hybrid vehicle 20E of the third embodiment executes the engine misfire identification processing of FIG. 3 and the ordinary engine misfire detection processing of FIG. 4, with the exception that the engine misfire identification device for an internal combustion engine mounted on the hybrid vehicle 20E of the third embodiment executes the resonance-region engine misfire detection processing schematically represented in FIG. 18 in place of the resonance-region engine misfire detection processing schematically represented in FIG. 5. The resonance-region engine misfire detection processing schematically represented in FIG. 5, the engine misfire identification processing of FIG. 3 and the ordinary engine misfire detection processing of FIG. 4 were also described above.

In the engine misfire identification device for an internal combustion engine mounted on the hybrid vehicle 20E of the third embodiment, when the resonance-region engine misfire detection processing of FIG. 18 has been executed by an engine ECU 24, a CPU 24a of the engine ECU 24 first executes processing of inputting the rotation speed Ne of an engine 22 and the 10-degree rotation angular velocity ω10, which is a rotation angular velocity occurring each time a crankshaft 26 rotates through 10 degrees, and computed by the ω10 computation processing schematically represented in FIG. 14 (Step S800). The ω10 computation processing was also described above.

Subsequently, a high-pass filter is set on the basis of the rotation speed Ne of the engine 22 (Step S810), and the angular velocity after filtering ω10f is obtained by applying the set high-pass filter to the 10-degree rotation angular velocity ω10 (Step S820). In this connection, it is possible to set the high-pass filter by determining the number of basic high-pass filters described in the modification to the first embodiment and the second embodiment, i.e., basic high-pass filters in which the attenuation of the frequency component of explosive combustion of the 8-cylinder engine 22 is small, but the attenuation of the frequency component of the resonance of a rear portion including the damper 28 is large, according to the rotation speed Ne of the engine 22.

Next, a reciprocal mass inertia torque Tp, which is based on the inertia of parts such as a piston 132 and the like that perform a reciprocating motion among torques Te output from the engine 22, is calculated by the following equation (3) (Step S830). In Equation (3), "M" denotes the summation of the mass of reciprocating parts, "θ" denotes the angle from a reference position for the rotation position of the crankshaft 26 of the engine 22, "A" denotes the projected area of a top surface of a piston 132 of the engine 22, "ω" denotes the rotation angular velocity of the crankshaft 26 of the engine 22, and "V (θ)" denotes the volume within the cylinder of the engine 22 at the angle θ of the rotation position of the crankshaft 26. As is apparent from Equation (3), because the reciprocal mass inertia torque Tp changes depending on the volume V (θ) within the cylinder of the engine 22, basically, the reciprocal mass inertia torque Tp varies at the same frequency as that of explosive combustion. From this fact it is evident that the angular velocity after filtering ω10f can be used in place of the rotation angular velocity ω of the crankshaft 26 of the engine 22. Also, it is apparent that the crank angle CA may be used in place of the angle θ of the rotation position of the crankshaft 26. Therefore, by substituting the crank angle CA and the angular velocity after filtering ω10f for the angle θ of the rotation position of the crankshaft 26 and the rotation angular velocity ω of the crankshaft 26 in Equation (3), respectively, it is possible to calculate the reciprocal mass inertia torque Tp.

$$\text{reciprocal mass inertia torque } Tp = \quad (3)$$
$$\left(\frac{180}{\pi}\right)^3 \times \frac{M}{A^2} \times \omega \times \frac{dV(\theta)}{d\theta}\left(\omega \times \frac{d^2 V(\theta)}{d\theta^2} + \frac{d\omega}{d\theta} \times \frac{dV(\theta)}{d\theta}\right)$$

$$\omega p = \frac{1}{Ie} \int Tp \, dt \quad (4)$$

$$Ie\omega = Kdmp \cdot \Delta\theta + Cdmp(\omega - \omega inp) + Te \quad (5)$$

$$Ie\omega 10f = Tin + Tp \quad (6)$$

$$\omega 10f = \frac{1}{Ie} \int (Tin + Tp) dt \quad (7)$$

$$\omega j + \omega p = \frac{1}{Ie} \int (Tin + Tp) dt \quad (8)$$
$$= \frac{1}{Ie} \int Tin \, dt + \frac{1}{Ie} \int Tp \, dt$$

When the reciprocal mass inertia torque Tp has been calculated in this manner, by using the calculated reciprocal mass inertia torque Tp in Equation (4), the component of influence ωp exerted by the reciprocal mass inertia torque Tp on the rotation angular velocity of the crankshaft 26 is calculated (Step S840). In Equation (4), "Ie" denotes an inertia moment on the engine 22 side as viewed from the place of the damper 28. If the torque of cylinder inner pressure of the engine 22 is denoted by "Tin," then the torque Te of the engine 22 is expressed by a sum of the torque of cylinder inner pressure Tin and the reciprocal mass inertia torque Tp. On the other hand, Equation (5) is derived from a movement equation about the crankshaft 26. In Equation (5), "Kdmp" is a spring constant of the damper 28, "Cdmp" is a constant of an attenuation term, "Δθ" is a torsion angle in the crankshaft 26 and a carrier shaft 34a, "ω" is the rotation angular velocity of the crankshaft 26, and "ωinp" is the rotation angular velocity of a shaft on the rear portion side of the damper 28 (the shaft to which the carrier 34 is connected). When the resonance of a rear portion including the damper 28, i.e., a condition in which the effect of the resonance based on the torsion of the damper 28 is removed is considered, the rotation angular velocity ω of the crankshaft 26 of the left side of Equation (5) is replaced by the angular velocity after filtering ω10f which is such that the effect of the torque based on the torsion of the damper 28 is removed from the 10-degree rotation angular velocity ω10, which is a rotation angular velocity of the crankshaft 26, and the first term of the right side of Equation (5) is deleted. Because the attenuation term of the second term of the right side of Equation (5) is sufficiently small compared to other terms, this attenuation term can take the value 0.

Furthermore, the torque Te of the engine 22 can be a sum of the torque of cylinder inner pressure Tin and the reciprocal mass inertia torque Tp. If these are taken into consideration, Equation (5) is expressed as Equation (6). When this equation (6) is solved with respect to the angular velocity after filtering $\omega 10f$, Equation (7) is obtained. Furthermore, if the angular velocity after filtering $\omega 10f$ is regarded as a sum of the rotation angular velocity $\omega j$ of the crankshaft 26 due to the torque of cylinder inner pressure Tin plus the component of influence $\omega p$ exerted by the reciprocal mass inertia torque Tp on the rotation angular velocity of the crankshaft 26 ($\omega 10f = \omega j + \omega p$), then Equation (7) becomes Equation (8). Equation (4) can be derived from the relationship between the component of influence $\omega p$ exerted by the reciprocal mass inertia torque Tp on the rotation angular velocity of the crankshaft 26 and the reciprocal mass inertia torque Tp in Equation (8), i.e., the relationship that the second term of the left side of Equation (8) is equal to the second term of the right side of this equation.

When the component of influence $\omega p$ exerted by the reciprocal mass inertia torque Tp on the rotation angular velocity of the crankshaft 26 has been calculated in this manner, the identification angular velocity $\omega j$ is calculated by subtracting the calculated component of influence $\omega p$ from the angular velocity after filtering $\omega 10f$ (Step S850), the difference between the identification angular velocities of 0 degree (TDC) from a top dead center of the compression stroke of each cylinder and 90 degrees (ATDC90) from the top dead center, $\omega j$ (TDC) and $\omega j$ (ATDC90), [$\omega j$ (TDC)−$\omega j$ (ATDC90)], is calculated as the angular velocity difference $\omega D$ (Step S860), the difference from a value calculated as the angular velocity difference $\omega D$ before 360 degrees of the calculated angular velocity difference $\omega D$ (a 360-degree difference of angular velocity difference $\omega D$) [$\omega D - \omega D$ (before 360 degrees)] is calculated as the identification value $J\omega$ (Step S870), and the calculated identification value $J\omega$ is compared with the threshold value Jref (Step S880). When the identification value $J\omega$ is larger than the threshold value Jref, it is identified that the cylinder which is the object of calculation of the identification value $J\omega$ undergoes an engine misfire (Step S890) and the resonance-region engine misfire detection processing is finished. When the identification value $J\omega$ is smaller than the threshold value Jref, it is identified that the cylinder does not undergo an engine misfire and resonance-region engine misfire detection processing is finished. In this connection, as is apparent from Equation (8), this identification angular velocity $\omega j$ is the rotation angular velocity $\omega j$ of the crankshaft 26 due to the torque of cylinder inner pressure Tin. Because of the direct effect of the pressure in a cylinder, this rotation angular velocity $\omega j$ of the crankshaft 26 due to the torque of cylinder inner pressure Tin substantially reflects the effect of an engine misfire. Therefore, an engine misfire in the engine 22 can be identified with good accuracy by identifying the engine misfire by use of this rotation angular velocity $\omega j$, i.e., the identification angular velocity $\omega j$. Particularly, as is evident from Equation (3), the reciprocal mass inertia torque Tp increases with increasing rotation speed Ne of the engine 22. Therefore, even when the rotation speed Ne of the engine 22 is relatively large, it is possible to identify an engine misfire in the engine 22 with good accuracy. The reason why an engine misfire can be identified by using the identification value $J\omega$, which is a further 360-degree difference of the angular velocity difference $\omega D$, which is a difference between the identification angular velocities $\omega j$ (TDC) and $\omega j$ (ATDC90), is as follows. That is, in consideration of the fact that this is an 8-cylinder engine 22 in which explosive combustion occurs every 90 degrees of the crank angle, though variations occur to some extent, the angular velocity difference $\omega D$ and the identification value $J\omega$ take the value 0 in the case of normal combustion (explosion) in all cylinders and take positive values in the case of an engine misfire of the cylinder in question. Therefore, by setting an appropriate positive value as the threshold value Jref, it is possible to identify that when the identification value $J\omega$ is larger than the threshold value Jref, the corresponding cylinder undergoes an engine misfire.

According to the above-described engine misfire identification device for an internal combustion engine that is mounted on the hybrid vehicle 20E of the third embodiment, when the operating condition of the engine 22 belongs to a resonance region of a rear portion including the damper 28, the component of influence $\omega p$ exerted by the reciprocal mass inertia torque Tp on the rotation angular velocity of the crankshaft 26 is subtracted from the angular velocity after filtering $\omega 10f$, which is obtained by applying a high-pass filter based on the rotation speed Ne of the engine 22 to the 10-degree rotation angular velocity $\omega 10$, which is a rotation angular velocity of the crankshaft 26 occurring every 10 degrees, whereby the identification angular velocity $\omega j$, which is a rotation angular velocity of the crankshaft 26 due to the torque of cylinder inner pressure Tin, is found and an engine misfire is identified by using this identification angular velocity $\omega j$. Therefore, regardless of the resonance of a rear portion including the damper 28 and the rotation speed Ne of the engine 22, it is possible to identify an engine misfire in any one of cylinders of the engine 22 with good accuracy.

In the engine misfire identification device for an internal combustion engine that is mounted on the hybrid vehicle 20E of the third embodiment, the angular velocity difference $\omega D$ is calculated from the difference between the identification angular velocities $\omega j$ (TDC) and $\omega j$ (ATDC90), the identification value $jW$ is calculated from a 360-degree difference of the calculated angular velocity difference $\omega D$, and an engine misfire of the engine 22 is identified on the basis of this calculated identification value $J\omega$. However, an engine misfire in the engine 22 may be identified by using any technique so long as it is intended for identifying an engine misfire in the engine 22 by using the identification angular velocity $\omega j$, which is obtained by subtracting the component of influence $\omega p$ exerted by the reciprocal mass inertia torque Tp on the rotation angular velocity of the crankshaft 26, from the angular velocity after filtering $\omega 10f$, for example, a technique that involves calculating the angular velocity difference at another angle of the identification angular velocity $\omega j$, calculating the identification value from a 360-degree difference of the calculated angular velocity difference or the like and identifying an engine misfire in the engine 22 on the basis of this calculated identification value, and a technique that involves identifying an engine misfire in the engine 22 by using a prescribed angular velocity difference, such as a 60-degree difference of the identification angular velocity $\omega j$, as the identification value.

The engine misfire identification processing in the engine misfire identification device for an internal combustion engine mounted on an hybrid vehicle of each of the above-described embodiments and modifications thereto is not predicated on, particularly, performing damping control for suppressing vibrations based on torque variations of a ring gear shaft 32a as a drive shaft by use of a motor MG1 or a motor MG2. However, even when damping control by use of the motor MG1 and the motor MG2 is performed, it is possible to identify an engine misfire in the engine 22 by the above-described engine misfire identification processing.

In the engine misfire identification device for an internal combustion engine mounted on a hybrid vehicle of each of the above-described embodiments and modifications thereto, an identification is made on an engine misfire in any one of cylinders of the 6-cylinder engine 22 and the 8-cylinder engine 22. However, any number of cylinders is permitted so long as the engine misfire identification device identifies an engine misfire in any one of cylinders of a multiple-cylinder engine, for example, the engine misfire identification device identifies an engine misfire in any one of cylinders of a 4-cylinder engine and the engine misfire identification device identifies an engine misfire in any one of cylinders of a 12-cylinder engine.

In the engine misfire identification device for an internal combustion engine mounted on a hybrid vehicle of each of the above-described embodiments and modifications thereto, an identification is made on an engine misfire in the engine 22 having such a configuration that the motor MG2 is connected to the ring gear shaft 32a via the reduction gear 35. However, an identification may be made on an engine misfire in the engine 22 having such a configuration that the motor MG2 is connected to the ring gear shaft 32a via a transmission in place of the reduction gear 35. An identification may also be made on an engine misfire in the engine 22 having such a configuration that the motor MG2 is connected directly to the ring gear shaft 32a without the medium of the reduction gear 35 or a transmission.

Figure 19:
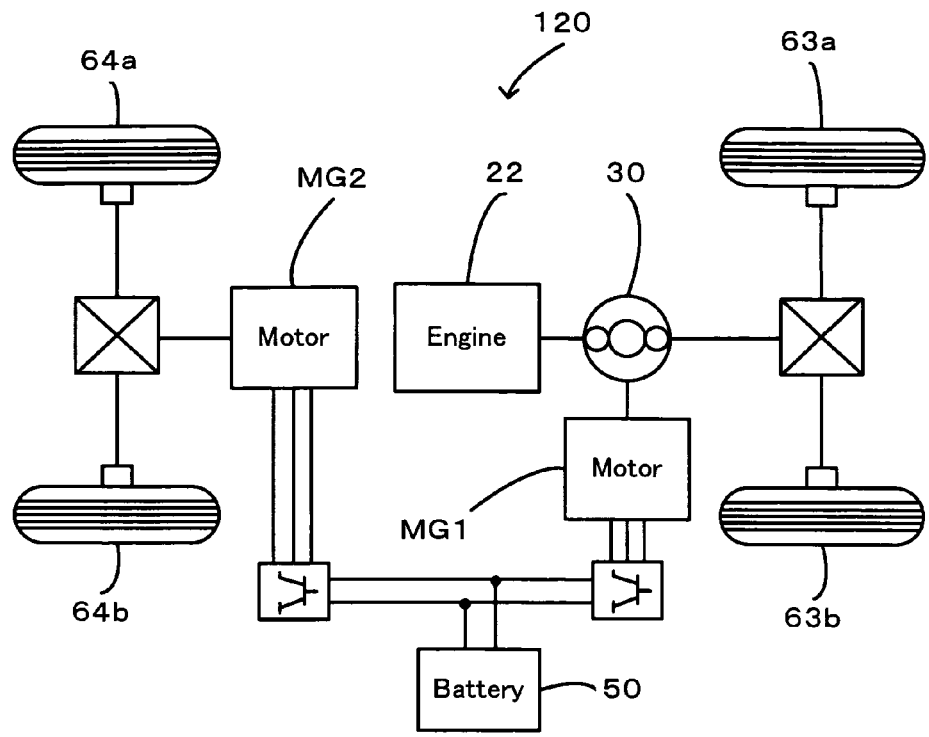
FIG. 19 is a block diagram showing a general configuration of a hybrid vehicle 120, which is a modification.
Figure 20:
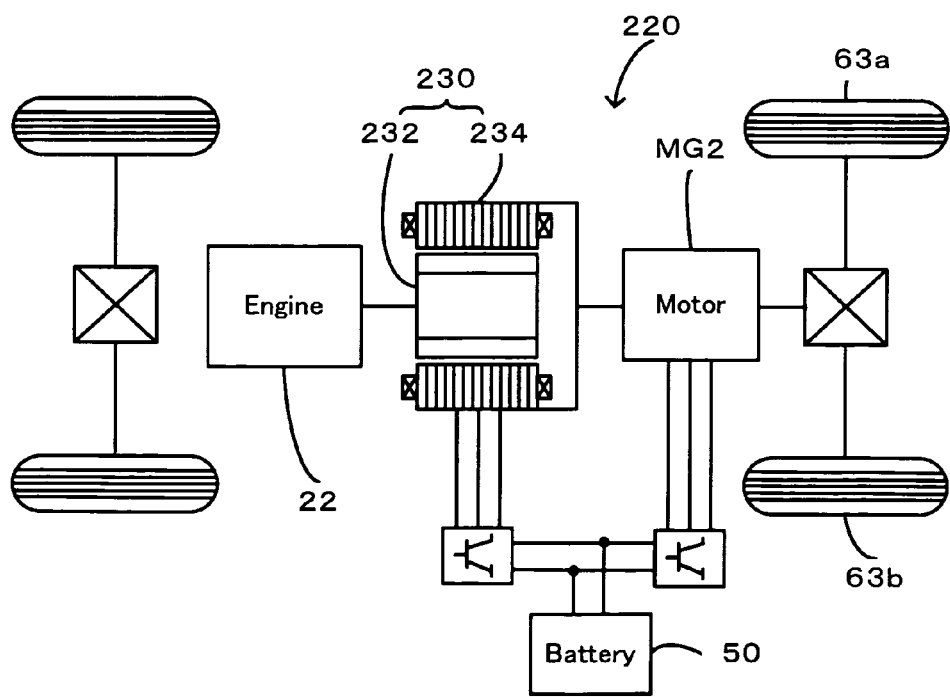
FIG. 20 is a block diagram showing a general configuration of a hybrid vehicle 220, which is a modification.

The engine misfire identification device for an internal combustion engine mounted on a hybrid vehicle of each of the above-described embodiments and modifications thereto has been described as the engine misfire identification device for the engine 22 in the form of apparatus comprising the power distribution and integration mechanism 30, which is connected to the crankshaft 26 of the engine 22 via the damper 28 as a torsion element and is connected to the rotating shaft of the motor MG1 and the ring gear shaft 32a as a drive shaft, and the motor MG2 connected to the ring gear shaft 32a via the reduction gear 35. However, because it is necessary only that the crankshaft of an engine be connected to a rear portion via a damper as a torsion element, as schematically represented in a hybrid vehicle 120 of the modification of FIG. 19, the engine misfire identification device may also be intended for use in the engine 22 installed in a system in which the power of the motor MG2 is connected to an axle (the axle connected to wheels 64a, 64b in FIG. 19) different from an axle to which the ring gear shaft 32a of the motor MG2 is connected (the axle to which the drive wheels 63a, 63b are connected). Furthermore, as schematically represented in a hybrid vehicle 220 of the modification of FIG. 20, the engine misfire identification device may also be intended for use in the engine 22 installed in a system that has an inner rotor 232 connected to the crankshaft 26 of the engine 22 via the damper 28 and an outer rotor 234 connected to the drive shaft that outputs power to drive wheels 63a, 63b and is provided with a pair-rotor motor 230 that transmits part of the power of the engine 22 to the drive shaft and converts the remaining power to electric power.

In the above-described first embodiment and modification thereto, an engine misfire in the engine 22 is identified by using the 30-degree rotation speed N30, which is a rotation speed occurring each time the crankshaft 26 rotates through 30 degrees, on the basis of the crank angle CA from the crank position sensor 140. However, an engine misfire in the engine 22 may also be identified by using the 30-degree rotation angular velocity $\omega 30$, which is a rotation angular velocity occurring each time the crankshaft 26 rotates through 30 degrees. This is because the 30-degree rotation angular velocity $\omega 30$ can be converted into the 30-degree rotation speed N30 by being multiplied by a conversion factor. In this case, the criterion of identification is not limited to a rotation angular velocity occurring each time the crankshaft 26 rotates through 30 degrees, and it is also possible to use various rotation angular velocity, such as a rotation angular velocity occurring each time the crankshaft 26 rotates through 10 degrees and a rotation angular velocity occurring each time the crankshaft 26 rotates through 5 degrees. Similarly, in the above-described second and third embodiments and modifications thereto, an engine misfire in the engine 22 is identified by using the 10-degree rotation angular velocity $\omega 10$, which is a rotation angular velocity occurring each time the crankshaft 26 rotates through 10 degrees, on the basis of the crank angle CA from the crank position sensor 140. However, an engine misfire in the engine 22 may be identified by using the 10-degree rotation speed N10, which is a rotation speed occurring each time the crankshaft 26 rotates through 10 degrees. In this case, the criterion of identification is not limited to a rotation speed occurring each time the crankshaft 26 rotates through 10 degrees, and it is also possible to use various rotation speeds, such as a rotation speed occurring each time the crankshaft 26 rotates through 5 degrees and a rotation speed occurring each time the crankshaft 26 rotates through 30 degrees.

Now a description will be given of the corresponding relationship between the principal elements of each of the embodiments and modifications thereto and the principal elements of the present invention described in Summary of the Invention. In the first embodiment, the 6-cylinder engine 22 connected to the crankshaft 26 in a rear portion via the damper 28 as a torsion element corresponds to "an internal combustion engine," the crank position sensor 140 that detects the rotation position of the crankshaft 26 corresponds to "a rotation position detection unit," the engine ECU 24 that executes the N30 computation processing of FIG. 6 for computing the 30-degree rotation speed N30, which is a rotation speed occurring each time the crankshaft 26 rotates through 30 degrees, on the basis of the crank angle CA from the crank position sensor 140 corresponds to "a unit rotation-angular rotation speed computation unit," and the engine ECU 24 that executes the engine misfire identification processing of FIG. 3 corresponds to "an engine misfire identification unit." This engine misfire identification processing involves making an identification as to whether or not the operating condition of the engine 22 is in a resonance region of a rear portion including the damper 28 (the power distribution and integration mechanism 30 and the like) on the basis of the rotation speed Ne and the torque Te of the engine 22, performing engine misfire detection to find out whether or not any one of cylinders of the engine 22 undergoes an engine misfire by the ordinary engine misfire detection processing schematically represented in FIG. 4 when it has been identified that the operating condition of the engine 22 is not in a resonance region of a rear portion including the damper 28, and performing engine misfire detection to find out whether or not any one of cylinders of the engine 22 undergoes an engine misfire by the resonance-region engine misfire detection processing schematically represented in FIG. 5 when it has been identified that the operating condition of the engine 22 is in a resonance region of a rear portion including the damper 28. In the second embodiment, the 8-cylinder engine 22 connected to the crankshaft 26 in a rear portion via the damper 28 as a torsion element corresponds to "an internal combustion engine," the crank position sensor 140 that detects the rotation position of the crankshaft 26 corresponds to "a rotation position detection unit," the engine ECU 24 that executes the $\omega 10$ computation processing of FIG. 14 for computing the 10-degree rotation angular velocity ω10, which is a rotation angular velocity occurring each time the crankshaft 26 rotates through 10 degrees, on the basis of the crank angle CA from the crank position sensor 140 corresponds to "a unit rotation-angle angular velocity computation unit," and the engine ECU 24 that executes the engine misfire identification processing of FIG. 3 corresponds to "an engine misfire identification unit." This engine misfire identification processing involves making an identification as to whether or not the operating condition of the engine 22 is in a resonance region of a rear portion including the damper 28 (the power distribution and integration mechanism 30 and the like) on the basis of the rotation speed Ne and the torque Te of the engine 22, performing engine misfire detection to find out whether or not any one of cylinders of the engine 22 undergoes an engine misfire by the ordinary engine misfire detection processing schematically represented in FIG. 4 when it has been identified that the operating condition of the engine 22 is not in a resonance region of a rear portion including the damper 28, and performing engine misfire detection to find out whether or not any one of cylinders of the engine 22 undergoes an engine misfire by the resonance-region engine misfire detection processing schematically represented in FIG. 13 when it has been identified that the operating condition of the engine 22 is in a resonance region of a rear portion including the damper 28. Furthermore, the power distribution and integration mechanism 30 connected to a shaft of a rear portion of the damper 28 and the ring gear shaft 32a as a drive shaft on the axle side and the motor MG1 connected to the sun gear 31 of this power distribution and integration mechanism 30 correspond to "an electric power-mechanical power input/output mechanism," and the motor MG2 that outputs power to the ring gear shaft 32a as a drive shaft via the reduction gear 35 corresponds to "a motor". Incidentally, for the corresponding relationship between the principal elements of each of the embodiments and modifications thereto and the principal elements of the present invention described in Summary of the Invention, each of the embodiments and modifications thereto is an example for concretely describing the Best Mode for Carrying Out the Invention described in Disclosure of the Invention. Therefore, each of the embodiments and modifications thereto does not limit the elements of the present invention described in Disclosure of the Invention. That is, the interpretation of the present invention described in Disclosure of the Invention should be performed on the basis of the descriptions in Disclosure of the Invention, and each of the embodiments and modifications thereto is only a concrete example of the present invention described in Disclosure of the Invention.

Incidentally, the present invention is not limited to an engine misfire identification device for an internal combustion engine mounted on such a hybrid vehicle, and may also be applied to an engine misfire identification device for an internal combustion engine mounted on a moving body other than an automobile and for an internal combustion engine built in equipment that does not move, such as construction facilities. The present invention may also take the form of an engine misfire identification method for an internal combustion engine.

The embodiments and their modifications discussed above are to be considered in all aspects as illustrative and not restrictive. There may be many other modifications, changes, and alterations without departing from the scope or spirit of the main characteristics of the present invention.

INDUSTRIAL APPLICABILITY

The present invention can be used in the manufacturing industries of an apparatus in which an internal combustion engine is built and an automobile on which an internal combustion engine is mounted, and the like.

The invention claimed is:

1. An engine misfire identification device for identifying an engine misfire for a multiple-cylinder internal combustion engine in which an output shaft is connected to a rear portion via a torsion element, said engine misfire identification device comprising:
    a rotation position detection unit that is configured to detect a rotation position of the output shaft of said internal combustion engine,
    a unit rotation-angle rotation speed computation unit that is configured to compute a unit rotation-angle rotation speed, which is a rotation speed for each prescribed unit rotation angle of the output shaft of said internal combustion engine, based on said detected rotation position, and
    an engine misfire identification unit that is configured to make an identification as to whether or not any one of cylinders of the internal combustion engine undergoes an engine misfire by using a first technique for said computed unit rotation-angle rotation speed, when a drive point of said internal combustion engine does not belong to a resonance region of a rear portion including said torsion element, and is configured to make an identification as to whether or not any one of cylinders of the internal combustion engine undergoes an engine misfire by using a second technique, which is different from said first technique, for said computed unit rotation-angle rotation speed, when the drive point of said internal combustion engine belongs to said resonance region, wherein
        said first technique is a technique for identifying an engine misfire on the basis of a variation in said computed unit rotation-angle rotation speed, and in that said second technique is a technique for identifying an engine misfire on the basis of a variation in a rotation speed after filtering that is obtained by applying a high-pass filter that cuts a low-frequency region for said computed unit rotation-angle rotation speed.

2. An engine misfire identification device according to claim 1, wherein said second technique is a technique that uses the high-pass filter suitable for the rotation speed of said internal combustion engine.

3. An engine misfire identification device according to claim 2, wherein said second technique uses the high-pass filter which is such that the larger the rotation speed of said internal combustion engine, a region of not more than a high frequency will be cut in proportion.

4. An engine misfire identification device according to claim 3, wherein said second technique uses the high-pass filter that cuts a region of not more than a frequency which is not less than a frequency half the rotation speed of said internal combustion engine.

5. An engine misfire identification device according to claim 1, wherein said second technique is a technique for identifying an engine misfire on the basis of a variation in the rotation speed after filtering, which is obtained by applying the high-pass filter to said computed unit rotation-angle rotation speed, the high-pass filter being obtained by changing, according to the rotation speed of said internal combustion engine, a prescribed number of high-pass filters in which the frequency attenuation of explosive combustion of said internal combustion engine is small, but the frequency attenuation obtained by dividing the frequency of the explosive combustion by the number of cylinders is large.

6. An engine misfire identification device according to claim 5, wherein said second technique is a technique for identifying an engine misfire on the basis of a variation in the rotation speed after filtering, which is obtained by applying, to said computed unit rotation-angle rotation speed, the high-pass filter having the tendency that the larger the rotation speed of said internal combustion engine, the smaller the prescribed number of high-pass filters.

7. An engine misfire identification device according to claim 6, wherein said second technique is a module that identifies an engine misfire on the basis of a variation in the rotation speed after filtering, which is obtained by applying, to said computed unit rotation-angle rotation speed, the high-pass filter that is constituted by a first number of high-pass filters as a prescribed high-pass filter in a case where the rotation speed of said internal combustion engine is less than a first rotation speed, and identifies an engine misfire on the basis of a variation in the rotation speed after filtering, which is obtained by applying, to said computed unit rotation-angle rotation speed, the high-pass filter that is constituted by a second number of filters smaller than said first number of filters as a prescribed high-pass filter in a case where the rotation speed of said internal combustion engine is equal to or more than said first rotation speed and less than a second rotation speed larger than the first rotation speed.

8. An engine misfire identification device according to claim 1, wherein said second technique is a technique for identifying an engine misfire on the basis of a variation in the rotation speed after filtering, which is obtained by applying, to said computed unit rotation-angle rotation speed, the high-pass filter suitable for a resonance period relationship, which is a relationship between the rotation of said internal combustion engine and the period of resonance occurring on the basis of the torsion of said torsion element.

9. An engine misfire identification device according to claim 8, wherein said second technique is such that an identification is made on an engine misfire on the basis of a variation in the rotation speed after filtering, which is obtained by applying, to said computed unit rotation-angle rotation speed, a first high-pass filter, in which the attenuation of the frequency of explosive combustion of said internal combustion engine is small, but the attenuation of the frequency obtained by dividing the frequency of the explosive combustion by the number of cylinders and multiplying the divided frequency by 2 is large when the period of said resonance is one rotation of said internal combustion engine as said resonance period relationship, and an identification is made on an engine misfire on the basis of a variation in the rotation speed after filtering, which is obtained by applying, to said computed unit rotation-angle rotation speed, a second high-pass filter, in which the attenuation of the frequency of explosive combustion of said internal combustion engine is small, but the attenuation of the frequency obtained by dividing the frequency of the explosive combustion by the number of cylinders is large when the period of said resonance is two rotations of said internal combustion engine as said resonance period relationship.

10. An engine misfire identification device according to claim 9, wherein said first high-pass filter is constituted by a first number of prescribed high-pass filters, in which the attenuation of the frequency of explosive combustion of said internal combustion engine is small, but the attenuation of the frequency obtained by dividing the frequency of the explosive combustion by the number of cylinders is large, and in that said second high-pass filter is constituted by a second number of said prescribed high-pass filters smaller than said first number of high-pass filters.

11. An engine misfire identification device according to claim 1, wherein in said second technique an engine misfire is identified to have occurred when the amount of variation in said rotation speed after filtering is less than the amount of variation in a threshold value.

12. An engine misfire identification device according to claim 11, wherein said second technique is a technique for identifying an engine misfire by using the amount of variation in a threshold value suitable for an output torque of said internal combustion engine.

13. An engine misfire identification device according to claim 1, wherein an engine misfire is identified by using a unit rotation-angle angular velocity, which is a rotation angular velocity for each prescribed unit rotation angle of an output shaft of said internal combustion engine, in place of said unit rotation-angle rotation speed.

14. An engine misfire identification device for identifying an engine misfire for a multiple-cylinder internal combustion engine in which an output shaft is connected to a rear portion via a torsion element, said engine misfire identification device comprising:
    a rotation position detection unit that is configured to detect a rotation position of the output shaft of said internal combustion engine,
    a unit rotation-angle angular velocity computation unit that is configured to compute a unit rotation-angle angular velocity, which is a rotation angular velocity for each prescribed unit rotation angle of the output shaft of said internal combustion engine, based on said detected rotation position, and
    an engine misfire identification unit that is configured to make an identification as to whether or not any one of cylinders of the internal combustion engine undergoes an engine misfire by using a first technique for said computed unit rotation-angle angular velocity, when a drive point of said internal combustion engine does not belong to a resonance region of a rear portion including said torsion element, and is configured to make an identification as to whether or not any one of cylinders of the internal combustion engine undergoes an engine misfire by using a second technique, which is different from said first technique, for said computed unit rotation-angle angular velocity, when the drive point of said internal combustion engine belongs to said resonance region, wherein
    said first technique is a technique for identifying an engine misfire on the basis of said computed unit rotation-angle angular velocity, and in that said second technique is a technique for identifying an engine misfire on the basis of an angular velocity after filtering that is obtained by applying a high-pass filter that cuts a low-frequency region for said computed unit rotation-angle angular velocity.

15. An engine misfire identification device according to claim 14, wherein said second technique is a technique for identifying an engine misfire by subjecting said angular velocity after filtering to identification processing for high loads when said internal combustion engine is operating under a high load of not less than a prescribed load, and for identifying an engine misfire by subjecting said angular velocity after filtering to identification processing for low loads different from said identification processing for high loads when said internal combustion engine is operating under a low load of less than said prescribed load.

16. An engine misfire identification device according to claim 15, wherein said identification processing for high loads is processing for identifying an engine misfire on the basis of an identification parameter for high loads, which is obtained by integrating an absolute value of a differentiated value of said angular velocity after filtering in a first prescribed range.

17. An engine misfire identification device according to claim 16, wherein said first prescribed range is a first prescribed crank angle range, which is included between a top dead center in the compression stroke of a cylinder in question among said plurality of cylinders and a top dead center in the compression stroke of the next cylinder of the cylinder in question.

18. An engine misfire identification device according to claim 16, wherein said identification processing for high loads is processing for identifying that an engine misfire has occurred when said identification parameter for high loads is less than said prescribed value for high loads.

19. An engine misfire identification device according to claim 15, wherein said identification processing for low loads is processing for identifying an engine misfire on the basis of an identification parameter for low loads, which is obtained by integrating said angular velocity after filtering in a second prescribed range.

20. An engine misfire identification device according to claim 19, wherein said second prescribed range is a first prescribed crank angle range, which is included between a top dead center in the compression stroke of a cylinder in question among said plurality of cylinders and a top dead center in the compression stroke of the next cylinder of the cylinder in question.

21. An engine misfire identification device according to claim 19, wherein said identification processing for low loads is processing for identifying that an engine misfire has occurred when said identification parameter for low loads is less than said prescribed value for low loads.

22. An engine misfire identification device according to claim 15, wherein said second technique is a technique for identifying an engine misfire by performing said identification processing for low loads regardless of the load of said internal combustion engine when said internal combustion engine is warming up in order to activate a catalyst included in a purifier that purifies exhaust gases of said internal combustion engine.

23. An engine misfire identification device according to claim 14, wherein said second technique is a technique that involves computing a component of influence exerted by a reciprocal mass inertia torque, which is based on the inertia of parts that perform a reciprocating motion among torques output from said internal combustion engine, upon the rotation angular velocity of an output shaft of said internal combustion engine, and identifying an engine misfire by using an identification angular velocity, which is obtained by subtracting said computed component of influence from said angular velocity after filtering.

24. An engine misfire identification device according to claim 23, wherein said reciprocal mass inertia torque is expressed by the following formula, where the summation of the mass of reciprocating parts is M, the angle from a reference position for the rotation position of an output shaft of said internal combustion engine is θ, the projected area of a top surface of a piston of said internal combustion engine is A, the rotation angular velocity of an output shaft of said internal combustion engine is ω, and the volume within the cylinder of said internal combustion engine is expressed by V (θ) as a function of the angle θ of the rotation position of said output shaft:

reciprocal mass inertia torque $Tp =$ $$\left(\frac{180}{\pi}\right)^3 \times \frac{M}{A^2} \times \omega \times \frac{dV(\theta)}{d\theta}\left(\omega \times \frac{d^2V(\theta)}{d\theta^2} + \frac{d\omega}{d\theta} \times \frac{dV(\theta)}{d\theta}\right).$$

25. An engine misfire identification device according to claim 14, wherein an identification is made on an engine misfire by using a unit rotation-angle rotation speed, which is a rotation speed for each prescribed unit rotation angle of an output shaft of said internal combustion engine, in place of said unit rotation-angle angular velocity.

26. A vehicle, comprising:
a multiple-cylinder internal combustion engine in which an output shaft is connected to a rear portion that is provided on the axle side via a damper as a torsion element,
a rotation position detection unit that is configured to detect a rotation position of the output shaft of said internal combustion engine,
a unit rotation-angle rotation speed computation unit that is configured to compute a unit rotation-angle rotation speed, which is a rotation speed for each prescribed unit rotation angle of the output shaft of said internal combustion engine, based on said detected rotation position, and
an engine misfire identification unit that is configured to make an identification as to whether or not any one of cylinders of said internal combustion engine undergoes an engine misfire by using a first technique for said computed unit rotation-angle rotation speed, when a drive point of said internal combustion engine does not belong to a resonance region of a rear portion including said torsion element, and is configured to make an identification as to whether or not any one of cylinders of said internal combustion engine undergoes an engine misfire by using a second technique, which is different from said first technique, for said computed unit rotation-angle rotation speed, when the drive point of said internal combustion engine belongs to said resonance region, wherein
said first technique is a technique for identifying an engine misfire on the basis of a variation in said computed unit rotation-angle rotation speed, and in that said second technique is a technique for identifying an engine misfire on the basis of a variation in a rotation speed after filtering that is obtained by applying a high-pass filter that cuts a low-frequency region for said computed unit rotation-angle rotation speed.

27. A vehicle according to claim 26, wherein said vehicle comprises an electric power-mechanical power input/output mechanism, which is connected to a damper shaft connected to the damper on the rear portion side of said damper and a drive shaft connected to the axle side, and inputs and outputs mechanical power to and from said damper shaft and said drive shaft, with the input and output of electric power and mechanical power involved, and an electric motor that inputs and outputs mechanical power to and from said drive shaft.

28. An engine misfire identification method for identifying an engine misfire in a multiple-cylinder internal combustion engine in which an output shaft is connected to a rear portion via a torsion element, said engine misfire identification method comprises:

computing a unit rotation-angle rotation speed, which is a rotation speed for each prescribed unit rotation angle of the output shaft of said internal combustion engine, on the basis of a rotation position of the output shaft of said internal combustion engine, making an identification as to whether or not any one of cylinders of the internal combustion engine undergoes an engine misfire by using a first technique for said computed unit rotation-angle rotation speed, when a drive point of said internal combustion engine does not belong to a resonance region of a rear portion including said torsion element, and making an identification as to whether or not any one of cylinders of the internal combustion engine undergoes an engine misfire by using a second technique, which is different from said first technique, for said computed unit rotation-angle rotation speed, when the drive point of said internal combustion engine belongs to said resonance region, wherein said first technique is a technique for identifying an engine misfire on the basis of a variation in said computed unit rotation-angle rotation speed, and in that said second technique is a technique for identifying an engine misfire on the basis of a variation in a rotation speed after filtering that is obtained by applying a high-pass filter that cuts a low-frequency region for said computed unit rotation-angle rotation speed.

29. An engine misfire identification method according to claim 28, wherein said second technique is a technique for identifying an engine misfire on the basis of a variation in the rotation speed after filtering, which is obtained by applying the high-pass filter to said computed unit rotation-angle rotation speed, the high-pass filter being obtained by changing, according to the rotation speed of said internal combustion engine, a prescribed number of high-pass filters in which the frequency attenuation of explosive combustion of said internal combustion engine is small, but the frequency attenuation obtained by dividing the frequency of the explosive combustion by the number of cylinders is large.

30. An engine misfire identification method according to claim 28, wherein said second technique is a technique for identifying an engine misfire on the basis of a variation in the rotation speed after filtering, which is obtained by applying, to said computed unit rotation-angle rotation speed, the high-pass filter suitable for a resonance period relationship, which is a relationship between the rotation of said internal combustion engine and the period of resonance occurring on the basis of the torsion of said torsion element.

31. An engine misfire identification method for identifying an engine misfire in a multiple-cylinder internal combustion engine in which an output shaft is connected to a rear portion via a torsion element, said engine misfire identification method comprises:

computing a unit rotation-angle angular velocity, which is a rotation angular velocity for each prescribed unit rotation angle of the output shaft of said internal combustion engine, on the basis of a rotation position of the output shaft of said internal combustion engine, making an identification as to whether or not any one of cylinders of the internal combustion engine undergoes an engine misfire by using a first technique for said computed unit rotation-angle angular velocity, when a drive point of said internal combustion engine does not belong to a resonance region of a rear portion including said torsion element, and making an identification as to whether or not any one of cylinders of the internal combustion engine undergoes an engine misfire by using a second technique, which is different from said first technique, for said computed unit rotation-angle angular velocity, when the drive point of said internal combustion engine belongs to said resonance region, wherein said first technique is a technique for identifying an engine misfire on the basis of said computed unit rotation-angle angular velocity, and in that said second technique is a technique for identifying an engine misfire on the basis of an angular velocity after filtering that is obtained by applying a high-pass filter that cuts a low-frequency region for said computed unit rotation-angle angular velocity.

32. An engine misfire identification method according to claim 31, wherein said second technique is a technique for making an identification on an engine misfire on the basis of an identification parameter for high loads, which is obtained by integrating an absolute value of a differentiated value of said angular velocity after filtering in a first prescribed range, when said internal combustion engine is operating under a high load of not less than a prescribed load, and an identification is made on an engine misfire on the basis of an identification parameter for low loads, which is obtained by integrating said angular velocity after filtering in a second prescribed range, when said internal combustion engine is operating under a low load of less than said prescribed load.

33. An engine misfire identification method according to claim 31, wherein said second technique is a technique that involves computing a component of influence exerted by a reciprocal mass inertia torque, which is based on the inertia of parts that perform a reciprocating motion among torques output from said internal combustion engine, upon the rotation angular velocity of an output shaft of said internal combustion engine, and identifying an engine misfire by using an identification angular velocity, which is obtained by subtracting said computed component of influence from said angular velocity after filtering.

* * * * *